US012647922B2

(12) United States Patent
Tiwari et al.

(10) Patent No.: US 12,647,922 B2
(45) Date of Patent: Jun. 2, 2026

(54) METHOD OF CORE NETWORK APPARATUS, METHOD OF RADIO ACCESS NETWORK, CORE NETWORK APPARATUS AND RADIO ACCESS NETWORK

(71) Applicant: NEC Corporation, Tokyo (JP)

(72) Inventors: Kundan Tiwari, Tokyo (JP); Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 277 days.

(21) Appl. No.: 18/275,554

(22) PCT Filed: Feb. 3, 2022

(86) PCT No.: PCT/JP2022/004308
§ 371 (c)(1),
(2) Date: Aug. 2, 2023

(87) PCT Pub. No.: WO2022/172858
PCT Pub. Date: Aug. 18, 2022

(65) Prior Publication Data
US 2024/0107481 A1      Mar. 28, 2024

(30) Foreign Application Priority Data

Feb. 10, 2021    (IN) .............................. 202111005728

(51) Int. Cl.
*H04W 60/00*          (2009.01)
*H04W 60/04*          (2009.01)
(52) U.S. Cl.
CPC ....... *H04W 60/005* (2013.01); *H04W 60/002* (2025.08)

(58) Field of Classification Search
CPC .... H04W 60/005; H04W 60/04; H04W 76/15
See application file for complete search history.

(56) References Cited

U.S. PATENT DOCUMENTS

2019/0335413 A1*  10/2019  Kawasaki ............. H04W 60/04
2020/0112492 A1*   4/2020  Chatras ................... H04L 67/60

FOREIGN PATENT DOCUMENTS

WO        2020/071727 A1     4/2020
WO    WO-2020177523 A1 *  9/2020    ............ H04W 60/00

OTHER PUBLICATIONS

Registration Methods (Year: 2020).*
(Continued)

*Primary Examiner* — Joseph E Dean, Jr.
(74) *Attorney, Agent, or Firm* — Sughrue Mion, PLLC

(57) ABSTRACT

Disclosed are techniques for registering a user equipment (UE) to a new access and mobility management function (AMF). When a new access and mobility management function (AMF) determines that an old AMF is disjoint AMF i.e. they are not connected, then the new AMF fetches the UE context (5GMM and 5GSM context) from the old AMF via new generation radio access network (NG-RAN). The new AMF routes a Namf_Communication_UEContext-Transfer request message to the old AMF to fetch the UE contexts via NG-RAN. The old AMF sends the UE contexts in the Namf_Communication_UEContextTransfer response message to the new AMF via NG-RAN. Based on the context transfers between the new AMF and the old AMF, the UE is registered to the new AMF.

4 Claims, 15 Drawing Sheets

(56)         References Cited

OTHER PUBLICATIONS

Partial Supplementary European Search Report for EP Application No. 22752685.2, dated on Jul. 1, 2024.
Ericsson, "AMF reallocation", 3GPP Draft, S2-1911104, Oct. 14-18, 2019.
Huawei et al., "Discussion on AMF reallocation", 3GPP Draft, S3-200206, Mar. 2-6, 2020.
International Search Report for PCT Application No. PCT/JP2022/004308, mailed on May 10, 2022.
Written opinion for PCT Application No. PCT/JP2022/004308, mailed on May 10, 2022.
3GPP TR 21.905: "Vocabulary for 3GPP Specifications" V16.0.0 (Jun. 2019).
GSM Association Official Document NG.116: "Generic Network Slice Template" V2.0 (Oct. 2019).
3GPP TR 22.835: "Study on Enhanced Access to and Support of Network Slices" V0.2.0 (Nov. 2020).
3GPP TS 23.501: "System architecture for the 5G System (5GS)" V16.7.0 (Dec. 2020).
3GPP TS 23.502: "Procedures for the 5G System (5GS)" V16.7.0 (Dec. 2020).
3GPP TS 38.413: "NG Application Protocol (NGAP)" V16.4.0 (Jan. 2021).
3GPP TS 23.003: "Numbering, addressing and identification" V17.0.0 (Dec. 2020).
3rd Generation Partnership Project; Technical Specification Group Services and System Aspects; Procedures for the 5G System (5GS); Stage 2 (Release 16), 3GPP TS 23.502 V16.7.1 (Jan. 2021).
3rd Generation Partnership Project; Technical Specification Group Services and System Aspects; Study on the security of Access and Mobility Management Function (AMF) re-allocation; (Release 17), 3GPP TR 33.864 V0.3.0 (Jan. 2021).

* cited by examiner

METHOD OF CORE NETWORK APPARATUS, METHOD OF RADIO ACCESS NETWORK, CORE NETWORK APPARATUS AND RADIO ACCESS NETWORK

This application is a National Stage Entry of PCT/JP2022/004308 filed on Feb. 3, 2022, which claims priority from Indian Patent Application number 202111005728 filed on Feb. 10, 2021, the contents of all of which are incorporated herein by reference, in their entirety.

TECHNICAL FIELD

The present disclosure discloses a procedure to handle the registration procedure and user data transmission procedure related to disjoint slices in a 5G core network. The present subject matter discloses how the UE performs registration procedure for disjoint AMFs wherein the each disjoint AMFs supports different network slice.

BACKGROUND ART

Network slicing features defined in 3GPP release 15 and release 16 enable a great variety of communication services for operators and verticals alike. To enhance the commercial viability of Network Slicing, GSMA 5GJA has introduced in document NG.116 the concept of generic slice template (GST) [2] from which several Network Slice Types descriptions can be derived. Some of the parameters in the GST point explicitly to the definition of parameters and bounds on the service delivered to the end customer. However, the enforcement of some of these bounds and parameters are not supported by the 5GS yet.

3GPP SA1 study on Enhanced Access to and Support of Network Slice for Rel-18 [3] is looking at various use cases and scenarios using network slices, in order to identify potential service requirements for the 5G system. Some of the use case scenarios are as follows:

when there is a restriction of network slice to e.g., certain frequency bands/sub bands, RATs, geographical areas, networks and applications, when a UE has a subscription to multiple network slices and these network slices are deployed for e.g., different frequency bands/sub bands, RATs, geographical area and applications, when there is a preference or prioritization for a network slice over other network slices e.g. when there are conflicting constraints on network slice availability.

Currently UE cannot use multiple services served by disjoint networks simultaneously if services are spanned among multiple disjoint networks. The switching services that are served by different disjoint network causes a lot of signalling and delay for service activation.

SUMMARY OF INVENTION

Solution to Problem

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

According to an embodiment of the present disclosure, when a new access and mobility management function (AMF) determines that an old AMF is disjoint AMF i.e. they are not connected, then the new AMF fetches the UE context (5GMM and 5GSM context) from the old AMF via new generation radio access network (NG-RAN). The new AMF routes a Namf_Communication_UEContextTransfer request message to the old AMF to fetch the UE contexts via NG-RAN. The old AMF sends the UE contexts in the Namf_Communication_UEContextTransfer response message to the new AMF via NG-RAN. Based on the context transfers between the new AMF and the old AMF, the UE is registered to the new AMF.

According to another embodiment, when an AMF receives Registration Request message containing requested network slice selection assistance information (NSSAI) set to an S-NSSAI that cannot be handled in current AMF while UE is in 5GMM-CONNECTED state, the AMF request the UE to perform re-registration procedure for the new AMF by including a re-registration indicator in the registration accept message. In this way the UE is registered to a new AMF.

According to another embodiment of the present subject matter, a management scheme for disjoint networks is introduced by introducing a disjoint network identifier. The disjoint network identifier is used to identify a disjoint network uniquely within the public land mobile network (PLMN). The disjoint network identifier is provided to the NG-RAN by the AMF so that the NG-RAN can maintain an association between the AMF and disjoint network identifier.

Advantageous Effects of Invention

These and other objects, embodiments and advantages of the present disclosure will become readily apparent to those skilled in the art from the following detailed description of the embodiments having reference to the attached figures, the disclosure not being limited to any particular embodiments disclosed.

BRIEF DESCRIPTION OF DRAWINGS

The foregoing and further objects, features and advantages of the present subject matter will become apparent from the following description of exemplary embodiments with reference to the accompanying drawings, wherein like numerals are used to represent like elements.

It is to be noted, however, that the appended drawings along with the reference numerals illustrate only typical embodiments of the present subject matter, and are therefore, not to be considered for limiting of its scope, for the subject matter may admit to other equally effective embodiments.

DESCRIPTION OF EMBODIMENTS

Figure 1:
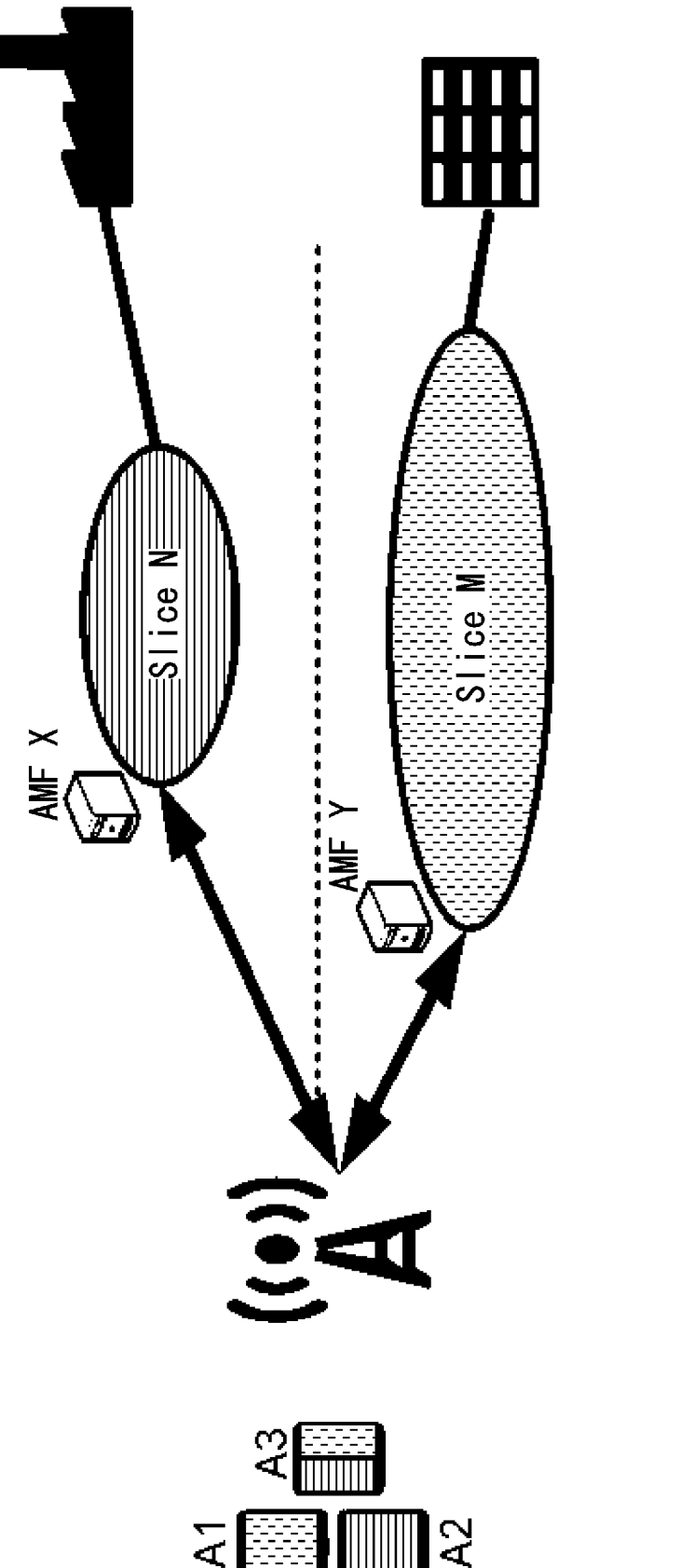
FIG. 1 illustrates a use case scenario of prior art where a radio access network connects to two different slices using two different access and management functions (AMFs) in an example embodiment of the present subject matter.

Each of example embodiments described below may be implemented independently or in combination with any other.

Those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or entities or subsystems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting. In the following specification and the claims, reference will be made to a number of terms, which shall be defined to have the following meanings. The singular forms "a", "an", and "the" include plural references unless the context clearly dictates otherwise.

As used herein, information is associated with data and knowledge, as data is meaningful information and represents the values attributed to parameters. Further knowledge signifies understanding of an abstract or concrete concept. Note that this example system is simplified to facilitate description of the disclosed subject matter and is not intended to limit the scope of this disclosure. Other devices, systems, and configurations may be used to implement the embodiments disclosed herein in addition to, or instead of, a system, and all such embodiments are contemplated as within the scope of the present disclosure.

The figures depict a simplified structure only showing some elements and functional entities, all being logical units whose implementation may differ from what is shown. The connections shown are logical connections; the actual physical connections may be different. It is apparent to a person skilled in the art that the structure may also comprise other functions and structures. Also, all logical units described and depicted in the figures include the software and/or hardware components required for the unit to function. Further, each unit may comprise within itself one or more components which are implicitly understood. These components may be operatively coupled to each other and be configured to communicate with each other to perform the function of the said unit.

In the current state of the art, as more network slices are deployed, it is likely that each UE is subscribed to multiple network slices. While some network slice services can be simultaneously provided to the UE, there can be network slices which cannot simultaneously provide services to the UE. This is because there are multiple related factors for a network slice, e.g., enterprise use vs personal use, isolation requirement, general public use vs public safety use, frequency limitation, location restriction, etc.

FIG. 1 demonstrates the use case scenario where a RAN node connects to Slice M provided via AMF Y and to the Slice N provided by AMF X of the same PLMN in an example embodiment of the present subject matter. For example, Slice M is used for public security and Slice N is used for Internet access. In the 5GC, the dedicated network resources and the network functionalities are separately customized for public security emergency service and video service to meet the isolation requirements, which ensures the independence of core network resources between different network slices. Accordingly, the two network slices are isolated and cannot be simultaneously provided to the UE. Such network slices are called disjoint network slices.

Subscription and Configuration:

UE A1 and A3 have a subscription to Slice M.

UE A2 and A3 have a subscription to Slice N.

For UE A3, it is configured which applications use which network slices.

Deployment:

Slice N and Slice M are isolated.

RAN is able to connect to both Slice M and Slice N.

Slice M and Slice N are provided by the same PLMN.

The UE can be configured with disjoint network slices network Slice M and network Slice N and network Slice M and network Slice N are supported by two different AMFs which does not have N14 interface due to disjoint requirement i.e. Two AMFs cannot communicate directly. Similarly, it is assumed that any 5GC nodes handing network slice M shall not able to communicate with any 5GC nodes handling network slice N due to disjoint requirement. For example, the AMF handling network slice M cannot communicate with any SMFs handling network slice N.

At one point of time, the UE is registered to AMF handling network slice M to access the services related to the network slice M. The UE receives a trigger from an application to access network slice N without any simultaneous access with disjoint network slices. In this situation it is not clear how the UE can be registered to the AMF handling network slice N.

For a UE authorized to access to multiple network slices of one operator which cannot be simultaneously used by the UE, the 5G system shall support the minimized interruption when the UE changes the access from one network slice to another network slice. (Example when triggered by changes of active applications).

According to an example embodiment of the present subject matter, when a new AMF determines that an old AMF is disjoint AMF i.e. they are not connected, then the new AMF fetches the UE context (5GMM and 5GSM context) from the old AMF via NG-RAN. The new AMF routes a Namf_Communication_UEContextTransfer request message to the old AMF to fetch the UE contexts via NG-RAN. The old AMF sends the UE contexts in the Namf_Communication_UEContextTransfer response message to the new AMF via NG-RAN.

Figure 2A:
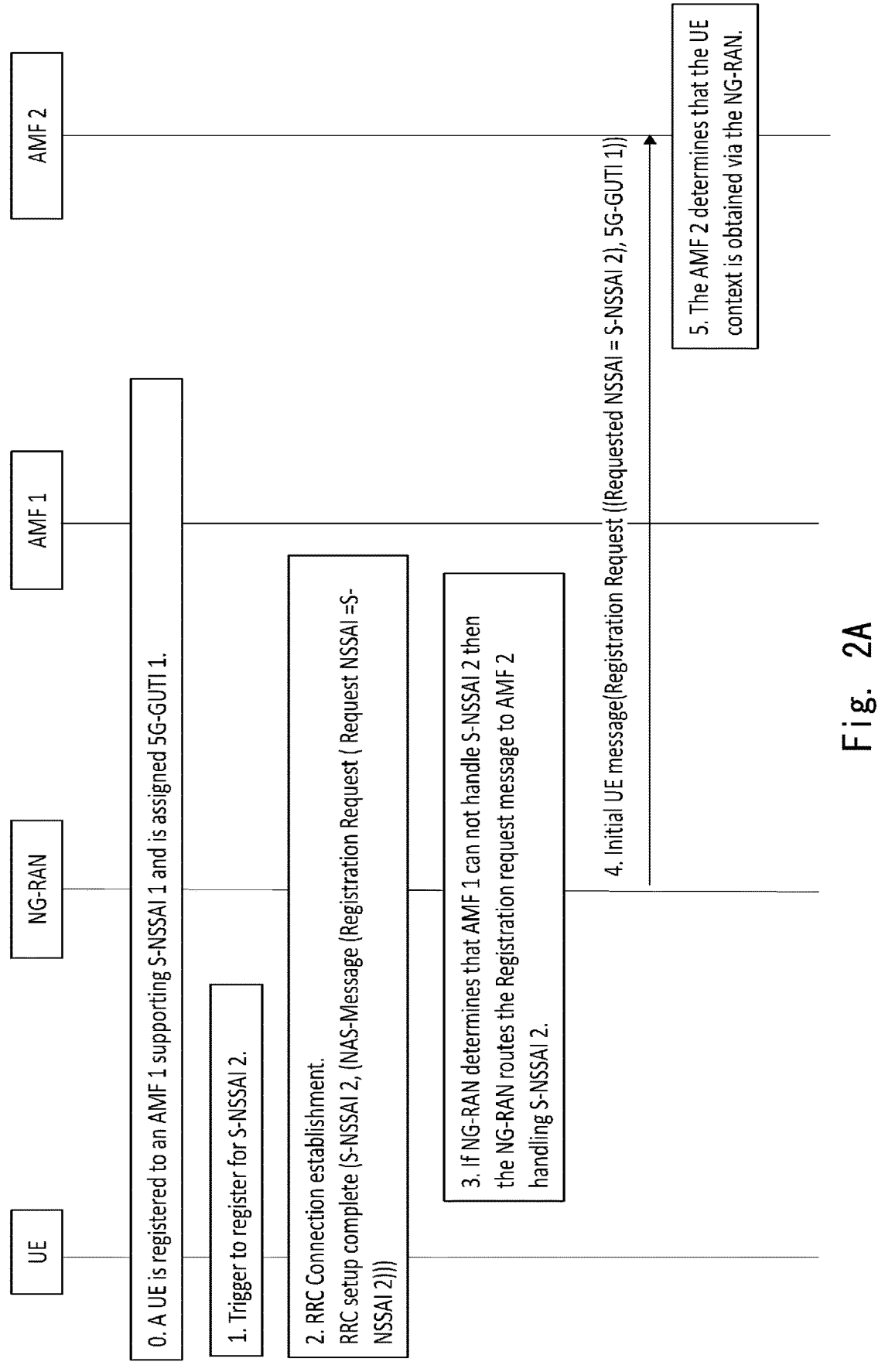
FIG. 2A illustrates an example of the registration procedure with user equipment (UE) context transfer between disjoint AMFs in another example embodiment of the present subject matter.

FIG. 2A illustrates an example of the registration procedure with UE context transfer between disjoint AMFs in an example embodiment of the present subject matter.

Figure 2B:
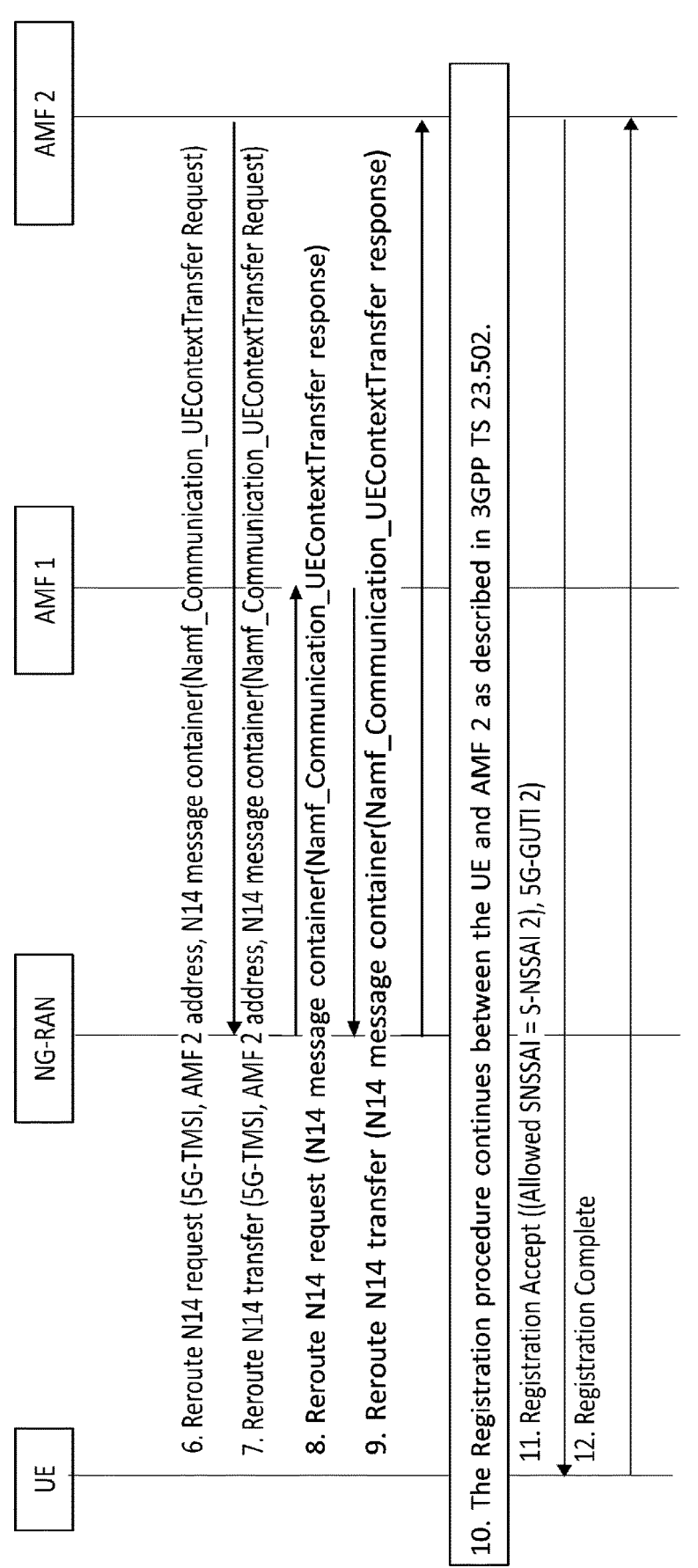
FIG. 2B illustrates an example of the registration procedure with user equipment (UE) context transfer between disjoint AMFs in another example embodiment of the present subject matter.

FIG. 2B illustrates an example of the registration procedure with UE context transfer between disjoint AMFs in an example embodiment of the present subject matter.

The detailed steps of the procedure are described below.

Step 0. The UE is configured with S-NSSAI 1 and S-NSSAI 2 which are handled by AMF 1 (only supports S-NSSAI 1) and AMF 2 (only supports S-NSSAI 2) respectively. The AMF 1 and the AMF 2 are disjoint AMFs i.e. the direct communication between the two AMFs is not possible i.e. there is no N14 interface between the AMF 1 (e.g. old AMF) and the AMF 2 (e.g. new AMF). The AMF 1 and the AMF 2 belongs to a same PLMN.

The UE is registered to the AMF 1 to access the services related to S-NSSAI 1. The UE is assigned a 5G-GUTI 1 by the AMF 1 and S-NSSAI 2 is the only network slice in the allowed NSSAI. The UE is in 5GMM-IDLE state.

Step 1. The UE receives a trigger from an application to register for S-NSSAI 2 only, (for example the UE receives trigger to send user data for the application that are related to S-NSSAI 2).

Step 2. The UE establishes RRC connection to the NG-RAN. The UE sends the RRC setup complete message to the NG-RAN with 5G-GUTI1, S-NSSAIs list IE=S-NSSAI 2 and Dedicated NAS-Message IE that includes the Registration request message with the requested NSSAI=S-NSSAI 2.

Step 3. The NG-RAN receives the RRC setup complete message with the 5G-GUTI 1 and S-NSSAI 2 in the S-NS-SAIs list IE and the Registration Request message in Dedicated NAS-Message IE. The NG-RAN analyses the received RRC setup complete message and may conclude that the UE has been registered to the AMF 1 based on the received 5G-GUTI 1 and the AMF 1 cannot support S-NSSAI 2 based on the supported S-NSSAIs information received during the NG Setup procedures between the NG-RAN and the AMF 1.

Step 4. Based on the analysis in step 3, although the NG-RAN knows that the UE has been associated with the AMF 1, the NG-RAN sends an Initial UE message containing Registration Request (Requested NSSAI=S-NSSAI 2 and 5G-GUTI 1) to the AMF 2.

Step 5. Upon reception of the Registration Request message, the AMF 2 checks the received 5G-GUTI 1 whether the UE contexts can be obtained from the AMF 1 (e.g. old AMF) directly or not.

Step 6. If the AMF 2 determines that the UE contexts can be obtained from the AMF 1 (e.g. old AMF) via the NG-RAN based on local configuration, the AMF 2 sends a Reroute_N14_Request message containing 5G-GUTI 1, AMF 2 address (e.g. IP address or FQDN of the AMF 2), N14 message container (Namf_Communication_UEContextTransfer Request) to the NG-RAN. The AMF 2 address information that can be routable from any disjoint networks may be configured in the AMF 2 or the AMF 2 obtains it from the NRF as described in section 6.3.5 of 3GPP TS 23.501 [4]. Alternately, the AMF 2 assigns a new 5G-GUTI to the UE and set it in the Reroute_N14_Request message.

Step 7. When the NG-RAN receives the Reroute_N14_Request message, the NG-RAN sends the Reroute_N14_transfer message containing the AMF 2 address or/and the new 5G-GUTI and the N14 message container (Namf_Communication_UEContextTransfer) to the AMF 1. The AMF 1 address is derived from the GUAMI part of the 5G-GUTI. The NG-RAN may store address of AMF 2.

Note that the NG-RAN may need to manage multiple IP address spaces per disjoint networks. For example, an IP address derived from a GUAMI part of the 5G-GUTI may only be valid in such disjoint network.

Note that the NG-RAN may have a Network Address Translation (NAT) function to support multiple disjoint networks. If any messages over N2 and N3 reference points needs to traverse different disjoint networks, the NG-RAN performs the NAT function to make it possible to communicate between AMFs and between UPFs that are located in different disjoint networks.

Step 8. The AMF 1 sends the Reroute_N14_Request message containing the containing AMF 2 address (e.g. IP address or FQDN of the AMF 2) or/and new 5G-GUTI and N14 message container (Namf_Communication_UEContextTransfer Response) to the NG-RAN. The Namf_Communication_UEContextTransfer Response contains the UE context.

Step 9. When the NG-RAN receives the Reroute_N14_Request message, the NG-RAN sends the Reroute_N14_transfer message containing the N14 message container (Namf_Communication_UEContextTransfer Response) to the AMF 2. AMF2 address or/and the new 5G-GUTI may be set in the Reroute_N14_transfer message containing the N14 message container (Namf_Communication_UEContextTransfer Response). If the new 5G-GUTI is set in the NG-RAN receives the Reroute_N14_Request message, the AMF 2 address is derived from the GUAMI part of the new 5G-GUTI.

Step 10. The Registration procedure continues as described in section 4.2.2.2.2 of 3GPP TS 23.502 [5].

Step 11. After successful registration procedure, the AMF 2 assigns a 5G-GUTI 2 as new 5G-GUTI to the UE and sends it in the Registration Accept message.

Step 12. Upon receiving the registration accept message the UE acknowledge the reception of registration accept message by sending the Registration complete message to the AMF 2.

According to another example embodiment of the present subject matter when a new AMF determines that an AMF 1 (e.g. old AMF) is disjoint AMF i.e. they are not connected, then established PDU sessions are suspended as an AMF 2 (e.g. new AMF) cannot maintain the established PDU sessions due to disjoint requirement.

Figure 3A:
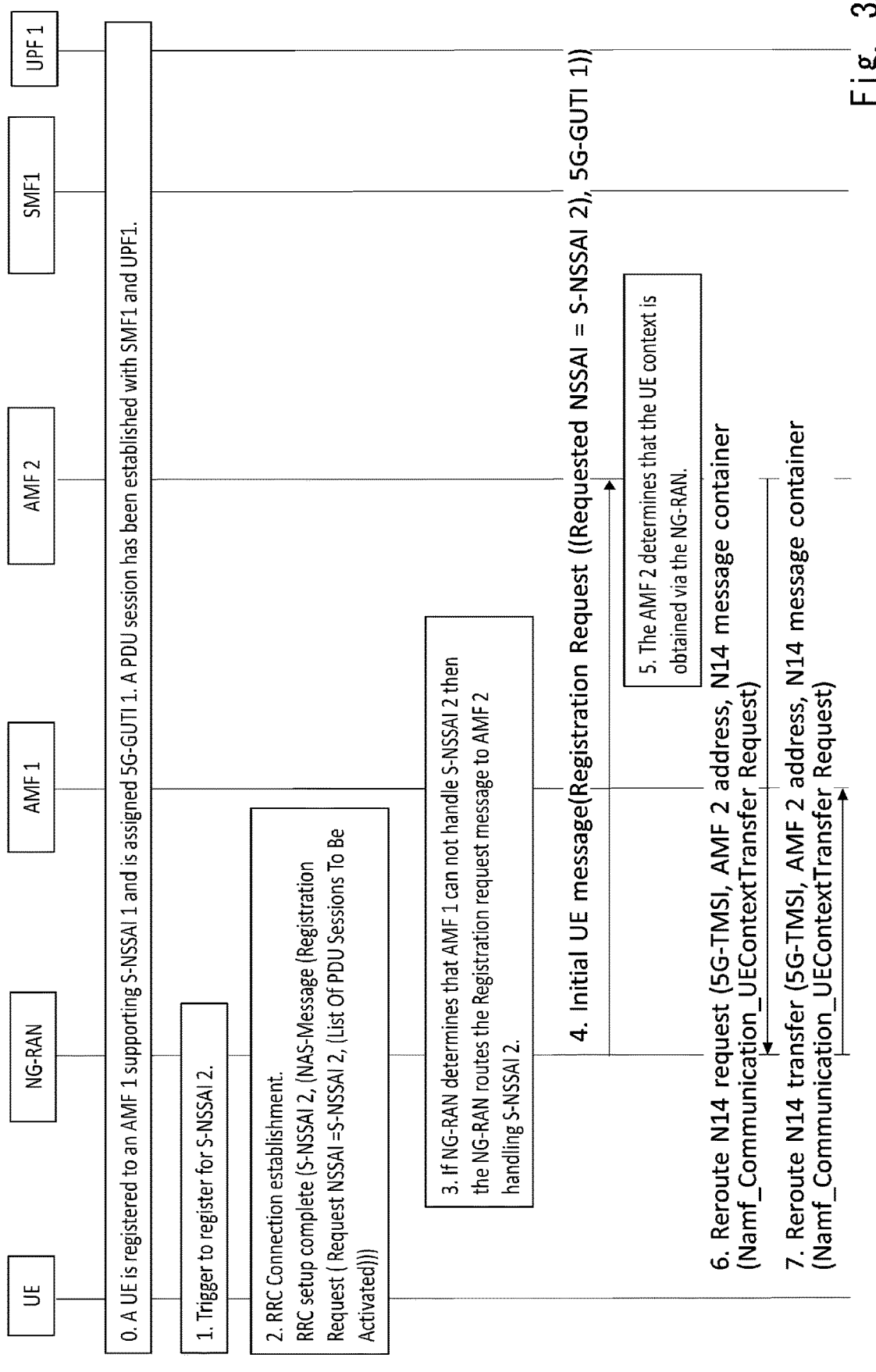
FIG. 3A illustrates an example of the registration procedure with protocol data unit (PDU) session suspension when the UE changes the access from one network slice to another network slice that belongs to disjoint network in yet another example embodiment of the present subject matter.

FIG. 3A illustrates an example of the registration procedure with PDU session suspension when the UE changes the access from one network slice to another network slice that belongs to disjoint network in an example embodiment of the present subject matter.

Figure 3B:
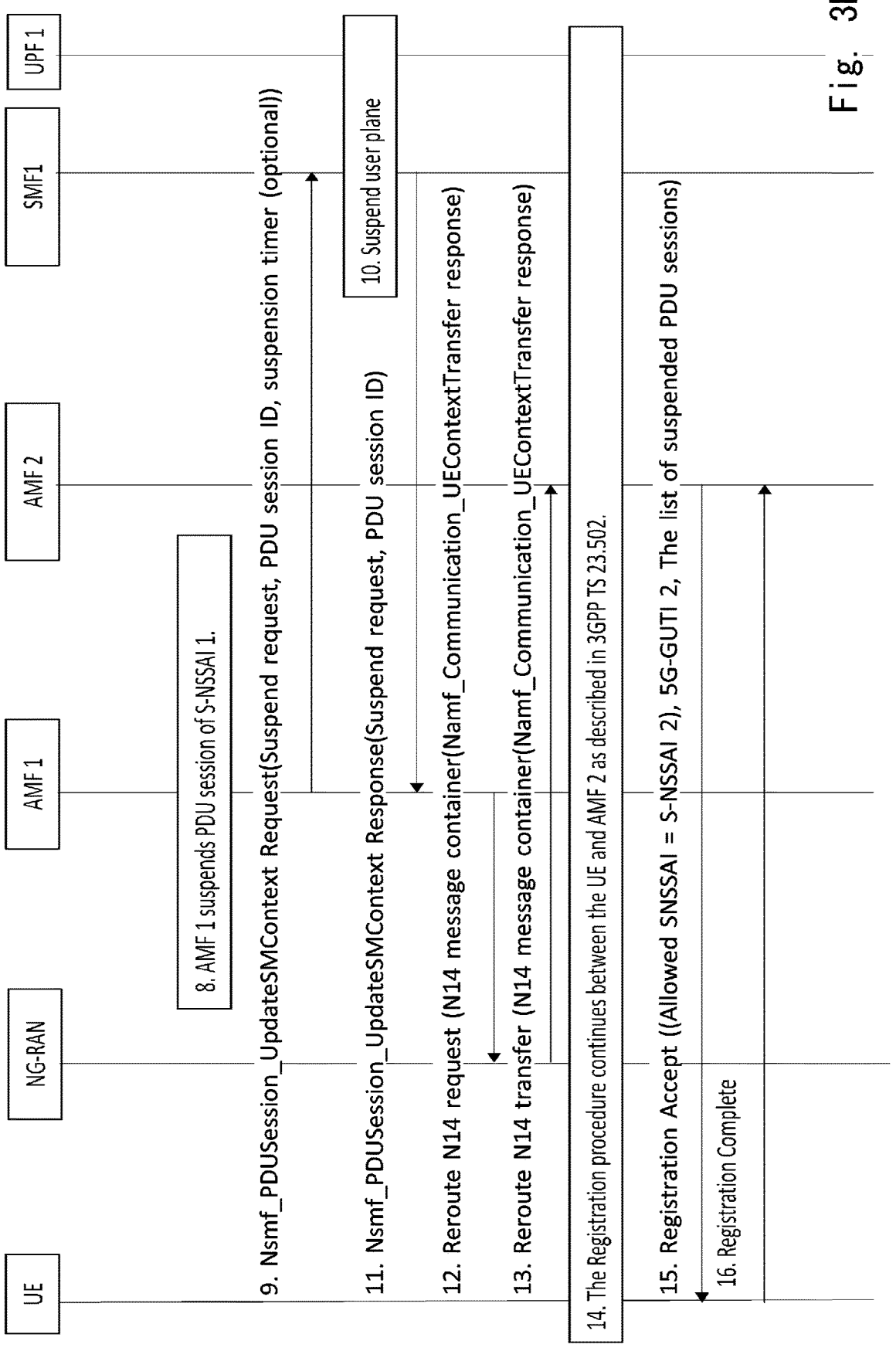
FIG. 3B illustrates an example of the registration procedure with protocol data unit (PDU) session suspension when the UE changes the access from one network slice to another network slice that belongs to disjoint network in yet another example embodiment of the present subject matter.

FIG. 3B illustrates an example of the registration procedure with PDU session suspension when the UE changes the access from one network slice to another network slice that belongs to disjoint network in an example embodiment of the present subject matter.

The detailed steps of the procedure is defined below.

Step 0. The UE is configured with S-NSSAI 1 and S-NSSAI 2 which are handled by AMF 1 (only supports S-NSSAI 1) and AMF 2 (only supports S-NSSAI 2) respectively. The AMF 1 and the AMF 2 are disjoint AMFs i.e. the direct communication between the two AMFs is not possible i.e. there is no N14 interface between the old AMF and the new AMF. The AMF 1 and the AMF 2 belongs to a same PLMN.

The UE is registered to the AMF 1 to access the services related to S-NSSAI 1. The UE is assigned a 5G-GUTI 1 by the AMF 1 and S-NSSAI 1 is the only network slice in the allowed NSSAI. The UE is in 5GMM-IDLE state. The PDU session has been established for the S-NSSAI 1. I.e. the user plane is established between UPF 1 and Data Network.

Step 1. The UE receives a trigger from an application to register for S-NSSAI 2 only, (for example the UE receives trigger to send user data for the application that are related to S-NSSAI 2).

Step 2. The UE establishes RRC connection to the NG-RAN. The UE sends the RRC setup complete message to the NG-RAN with 5G-GUTI1, S-NSSAIs list IE=S-NSSAI 2 and Dedicated NAS-Message IE that includes the Registration request message with the requested NSSAI=S-NSSAI 2 and optionally List Of PDU Sessions To Be Activated=S-NSSAI 2. In case the UE is aware that the established PDU sessions needs to be suspended, the UE may set the list of PDU sessions to be suspended information element (IE) with suspension timer IE in the Registration request message.

Step 3. The NG-RAN receives the RRC setup complete message with the 5G-GUTI 1 and S-NSSAI 2 in the S-NSSAIs list IE and the Registration Request message in Dedicated NAS-Message IE. The NG-RAN analyses the received RRC setup complete message and may conclude that the UE has been registered to the AMF 1 based on the received 5G-GUTI 1 and the AMF 1 cannot support S-NSSAI 2 based on the supported S-NSSAIs information received during the NG Setup procedures between the NG-RAN and the AMF 1.

Step 4. Based on the analysis in step 3, although the NG-RAN knows that the UE has been associated with the AMF 1, the NG-RAN sends an Initial UE message containing Registration Request (Requested NSSAI=S-NSSAI 2 and 5G-GUTI 1) to the AMF 2.

Step 5. Upon reception of the Registration Request message, the AMF 2 checks the received 5G-GUTI 1 whether the UE contexts can be obtained from the AMF (e.g. old AMF) directly or not. If the AMF 2 receives the list of PDU sessions to be suspended IE with suspension timer IE, the AMF 2 may set the list of PDU sessions to be suspended IE with suspension timer IE in the Namf_Communication_UEContextTransfer message. The AMF 2 may decide to set the list of PDU sessions to be suspended IE with suspension timer IE in the Namf_Communication_UEContextTransfer message based on the local configuration.

Step 6. If the AMF 2 determines that the UE contexts can be obtained from the AMF (e.g. old AMF) via the NG-RAN based on local configuration, the AMF 2 sends a Reroute_N14_Request message containing the 5G-GUTI 1, AMF 2 address (e.g. IP address or FQDN of the AMF 2), N14 message container (Namf_Communication_UEContextTransfer Request) to the NG-RAN. The AMF 2 address information that can be routable from any disjoint networks may be configured in the AMF 2 or the AMF 2 obtains it from the NRF as described in section 6.3.5 of 3GPP TS 23.501 [4]. Alternately, the AMF 2 assigns new 5G-GUTI to the UE and set it in the Reroute_N14_Request message.

Step 7. When the NG-RAN receives the Reroute_N14_Request message, the NG-RAN sends the Reroute_N14_transfer message containing the AMF 2 address or/and new 5G-GUTI and the N14 message container (Namf_Communication_UEContextTransfer) to the AMF 1. The AMF 1 address is derived from the GUAMI part of the 5G-GUTI. The NG-RAN may store address of AMF 2.

Step 8. When the AMF 1 receives the Reroute_N14_Transfer message containing the Namf_Communication_UEContextTransfer message, the AMF 1 determines that some or all established PDU sessions (I.e. PDU session related to the S-NSSAI 1) needs to be suspended or to be released.

This Decision is Made by the AMF 1, for Example, Based on Following Reasons:

The received Namf_Communication_UEContextTransfer message contains the list of PDU sessions to be suspended IE and the suspension timer IE.

The AMF 1 is aware that the AMF 2 does not support S-NSSAI 1.

The AMF 1 is aware that the AMF 2 is disjoint AMF.

Step 9. The AMF 1 invokes Nsmf_PDUSession_UpdateSMContext Request (PDU Session ID, Cause, Operation type, User Location Information, Age of Location Information, N2 SM Information (Secondary RAT usage data), suspension timer) to the SMF 1. The Operation Type is set to "UP Suspend" to indicate suspend of user plane resources for the PDU Session.

Step 10. The SMF 1 initiates an N4 Session Modification procedure by sending N4 Session Modification Request (Buffering on/off) message to the UPF 1 indicating the need to buffer the data at the UPF 1 coming from Data Network if the buffering is indicated otherwise no need to buffer the data. If the suspend timer is included in the message, The SMF starts the suspension timer in the SMF.

If the suspension timer expires, the SMF initiates the PDU Session Release procedure as described in the section 4.3.4 of 3GPP TS 23.502 [5].

The UPF 1 sends N4 Session Modification Response to acknowledge the SMF 1's request.

Step 11. The SMF 1 sends Nsmf_PDUSession_UpdateSMContext Response to the AMF 1.

Note that steps 9 to 11 in the FIG. 3A and FIG. 3B are equivalent with the steps 2 to 4 in the FIG. 4.8.1.2-1: NG-RAN initiated Connection Suspend procedure in 3GPP TS 23.502 [5]

Step 12. The AMF 1 sends the Reroute_N14_Request message containing the containing AMF 2 address (e.g. IP address or FQDN of the AMF 2) or/and new 5G-GUTI and N14 message container (Namf_Communication_UEContextTransfer Response) to the NG-RAN. The Namf_Communication_UEContextTransfer Response may contains the result of PDU session suspension.

Step 13. When the NG-RAN receives the Reroute_N14_Request message, the NG-RAN sends the Reroute_N14_transfer message containing the N14 message container (Namf_Communication_UEContextTransfer Response) to the AMF 2. AMF2 address or/and the new 5G-GUTI may be set in the Reroute_N14_transfer message containing the N14 message container (Namf_Communication_UEContextTransfer Response). If the new 5G-GUTI is set in the NG-RAN receives the Reroute_N14_Request message, The AMF 2 address is derived from the GUAMI part of the new 5G-GUTI.

Step 14. The Registration procedure continues as described in section 4.2.2.2.2 of 3GPP TS 23.502 [5].

Step 15. After successful registration procedure, the AMF 2 assigns a 5G-GUTI 2 as new 5G-GUTI to the UE and sends it in the Registration Accept message. The list of suspended PDU sessions IE may be set in the Registration Accept message.

According to another example embodiment of the present subject matter when an AMF 1 (e.g. new AMF) finds that some of PDU sessions are suspended, an AMF 2 (e.g. new AMF) resumes the suspended PDU sessions.

Figure 4A:
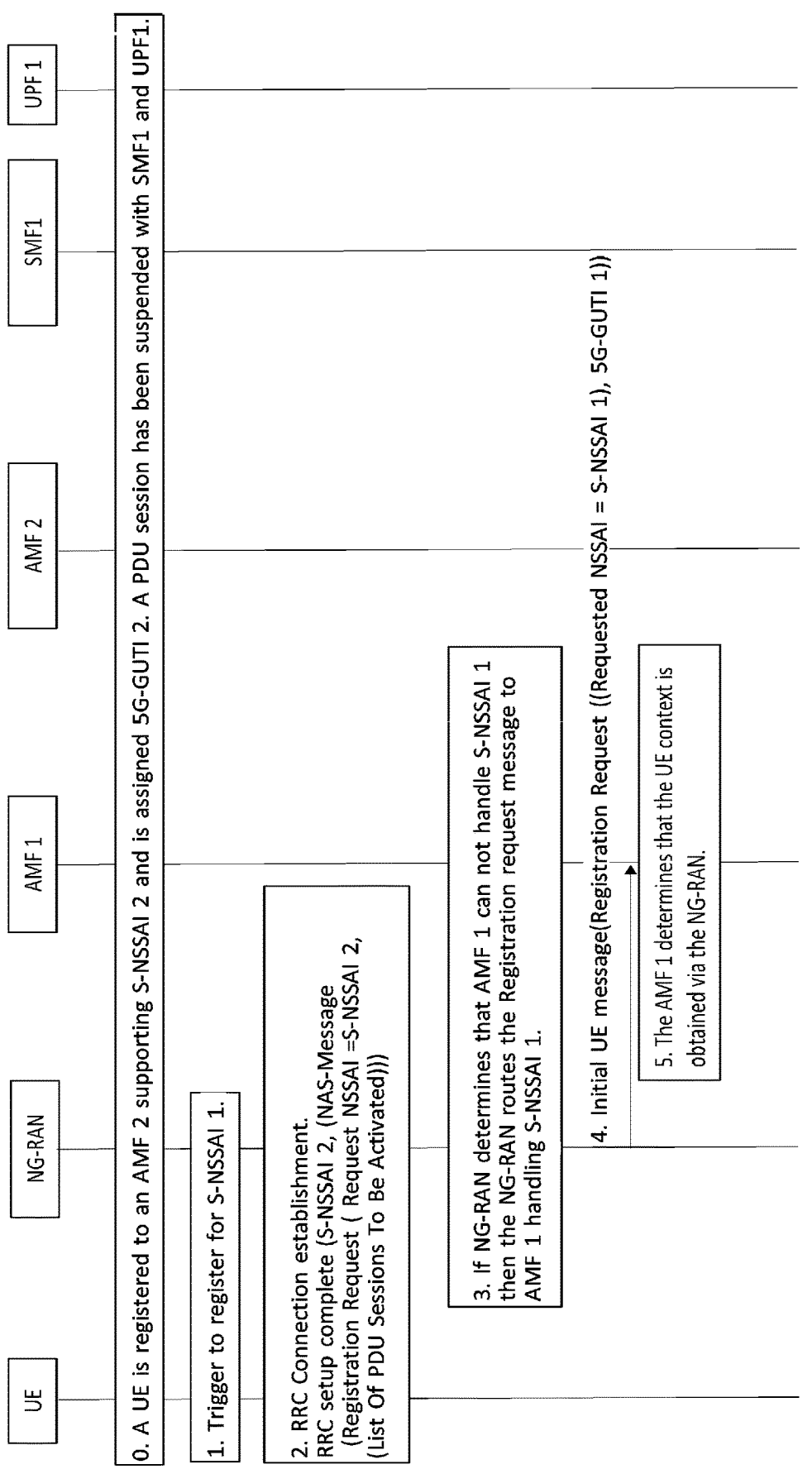
FIG. 4A illustrates an example of the registration procedure with PDU session resume in yet another example embodiment of the present subject matter.

FIG. 4A illustrates an example of the registration procedure with PDU session resume in an example embodiment of the present subject matter.

Figure 4B:
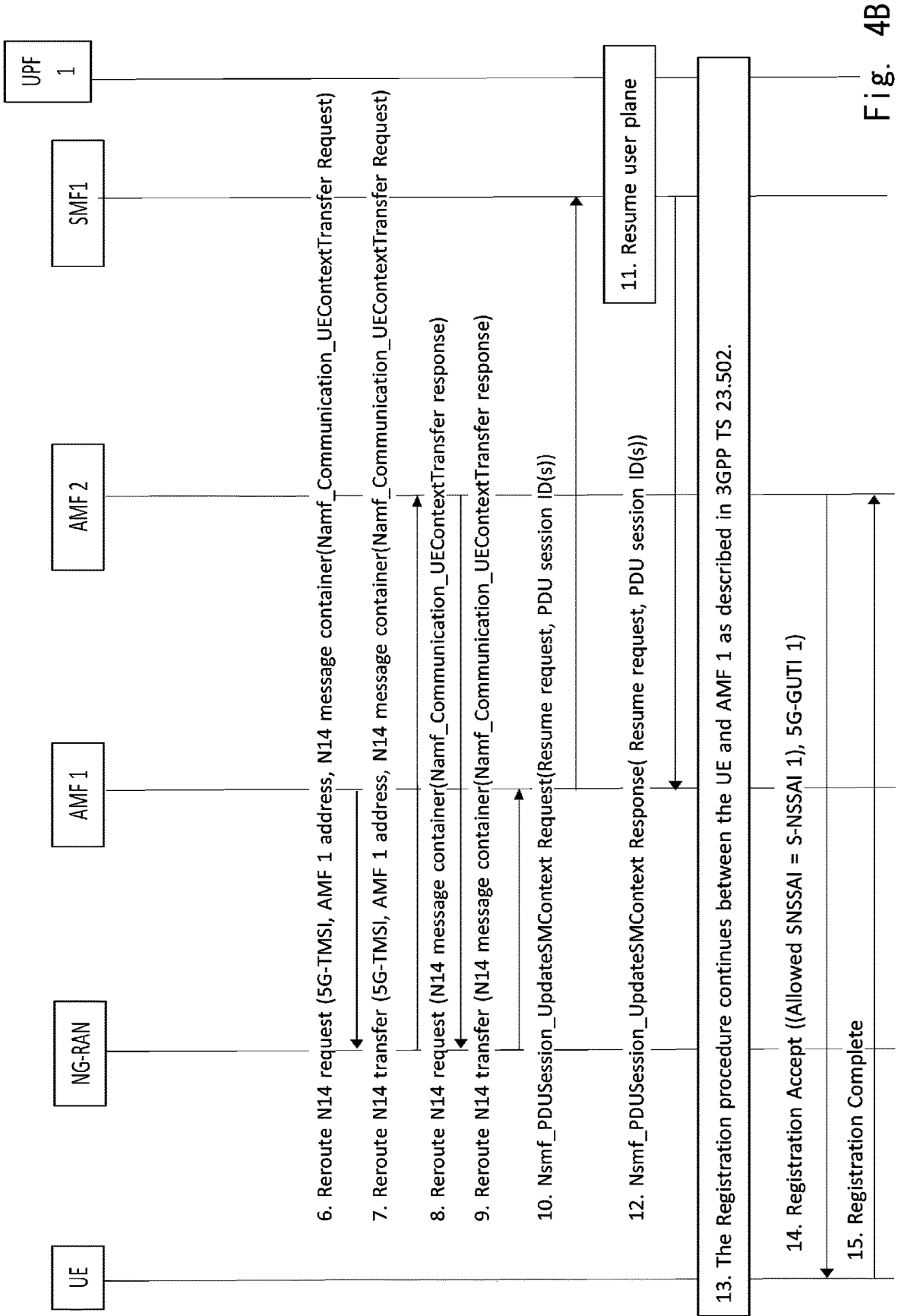
FIG. 4B illustrates an example of the registration procedure with PDU session resume in yet another example embodiment of the present subject matter.

FIG. 4B illustrates an example of the registration procedure with PDU session resume in an example embodiment of the present subject matter.

The detailed steps of the procedure is defined below.

Step 0. The UE is configured with S-NSSAI 1 and S-NSSAI 2 which are handled by AMF 1 (only supports S-NSSAI 1) and AMF 2 (only supports S-NSSAI 2) respectively. The AMF 1 and the AMF 2 are disjoint AMFs i.e. the direct communication between the two AMFs is not possible i.e. there is no N14 interface between the old AMF and the new AMF. The AMF 1 and the AMF 2 belongs to a same PLMN.

The UE is registered to the AMF 2 to access the services related to S-NSSAI 2. The UE is assigned a 5G-GUTI 2 by the AMF 2 and S-NSSAI 2 is the only network slice in the allowed NSSAI. The UE is in 5GMM-IDLE state. The PDU session has been suspended for the S-NSSAI 1. I.e. the user plane is established between UPF 1 and Data Network.

Step 1. The UE receives a trigger from an application to register for S-NSSAI 1 only, (for example the UE receives trigger to send user data for the application that are related to S-NSSAI 1).

Step 2. The UE establishes RRC connection to the NG-RAN. The UE sends the RRC setup complete message to the NG-RAN with 5G-GUTI2, S-NSSAIs list IE=S-NSSAI 1 and Dedicated NAS-Message IE that includes the Registration request message with the requested NSSAI=S-NSSAI 1 and optionally List Of PDU Sessions To Be Activated=S-NSSAI 1. In case the UE is aware that the established PDU sessions are suspended, the UE may set the list of PDU sessions to be resumed information element (IE) in the Registration request message.

Step 3. The NG-RAN receives the RRC setup complete message with the 5G-GUTI 2 and S-NSSAI 1 in the S-NSSAIs list IE and the Registration Request message in Dedicated NAS-Message IE. The NG-RAN analyses the received RRC setup complete message and may conclude that the UE has been registered to the AMF 2 based on the received 5G-GUTI 2 and the AMF 2 cannot support S-NSSAI 1 based on the supported S-NSSAIs information received during the NG Setup procedures between the NG-RAN and the AMF 2.

Step 4. Based on the analysis in step 3, although the NG-RAN knows that the UE has been associated with the AMF 2, the NG-RAN sends an Initial UE message containing Registration Request (Requested NSSAI=S-NSSAI 1 and 5G-GUTI 2) to the AMF 1.

Step 5. Upon reception of the Registration Request message, the AMF 1 checks the received 5G-GUTI whether the UE contexts can be obtained from the old AMF directly or not.

Step 6. If the AMF 1 determines that the UE contexts can be obtained from the old AMF via the NG-RAN based on local configuration, the AMF 1 sends a Reroute_N14_Request message containing 5G-GUTI 2, AMF 1 address (e.g. IP address or FQDN of the AMF 1), N14 message container (Namf_Communication_UEContextTransfer) to the NG-RAN. The AMF 1 address information that can be routable from any disjoint networks may be configured in the AMF 1 or the AMF 1 obtains it from the NRF as described in section 6.3.5 of 3GPP TS 23.501 [4]. Alternately, the AMF 1 assigns new 5G-GUTI to the UE and set it in the Reroute_N14_Request message.

Step 7. When the NG-RAN receives the Reroute_N14_Request message, the NG-RAN sends the Reroute_N14_transfer message containing the AMF 1 address or/and the new 5G-GUTI and the N14 message container (Namf_Communication_UEContextTransfer) to the AMF 2. The AMF 2 address is derived from the GUAMI part of the 5G-GUTI. The NG-RAN may store address of AMF 1.

Step 8. The AMF 2 sends the Reroute_N14_Request message containing the containing AMF 1 address (e.g. IP address or FQDN of the AMF 2) or/and new 5G-GUTI and N14 message container (Namf_Communication_UEContextTransfer Response) to the NG-RAN.

Step 9. When the NG-RAN receives the Reroute_N14_Request message, the NG-RAN sends the Reroute_N14_transfer message containing the N14 message container (Namf_Communication_UEContextTransfer Response) to the AMF 1. AMF1 address or/and the new 5G-GUTI may be set in the Reroute_N14_transfer message containing the N14 message container (Namf_Communication_UEContextTransfer Response). If the new 5G-GUTI is set in the NG-RAN receives the Reroute_N14_Request message, The AMF 1 address is derived from the GUAMI part of the new 5G-GUTI.

Step 10. If the AMF 1 receives the list of PDU sessions to be resumed IE in the Registration request message in step 4 or based on local information, The AMF 1 sends Nsmf_PDUSession_UpdateSMContext Request (Resume request, PDU session ID) to the SMF 1.

Step 11. The SMF 1 resumes the user plane for each PDU session by sending N4 Session Modification Request for each PDU session to the UPF 1. The UPF 1, after resuming the user plane, sends N4 Session Modification Response message to the SMF 1.

Step 12. The SMF 1 sends Nsmf_PDUSession_UpdateSMContext Response to the AMF 1.

Note that steps 10 to 12 in the FIG. 4A and FIG. 4B are equivalent with the steps 5 to 7 in the FIG. 4.8.2.3-1: Connection Resume in CM-IDLE with Suspend in 3GPP TS 23.502 [5]

Step 13. The Registration procedure continues as described in section 4.2.2.2.2 of 3GPP TS 23.502 [5].

Step 14. After successful registration procedure, the AMF 1 assigns a 5G-GUTI 1 as new 5G-GUTI to the UE and sends it in the Registration Accept message.

In yet another example embodiment, when an AMF receives Registration Request message containing Requested NSSAI set to an S-NSSAI that cannot be handled in current AMF while UE is in 5GMM-CONNECTED state, the AMF request the UE to perform re-registration procedure by including a re-registration indicator in the registration accept message.

Figure 5:
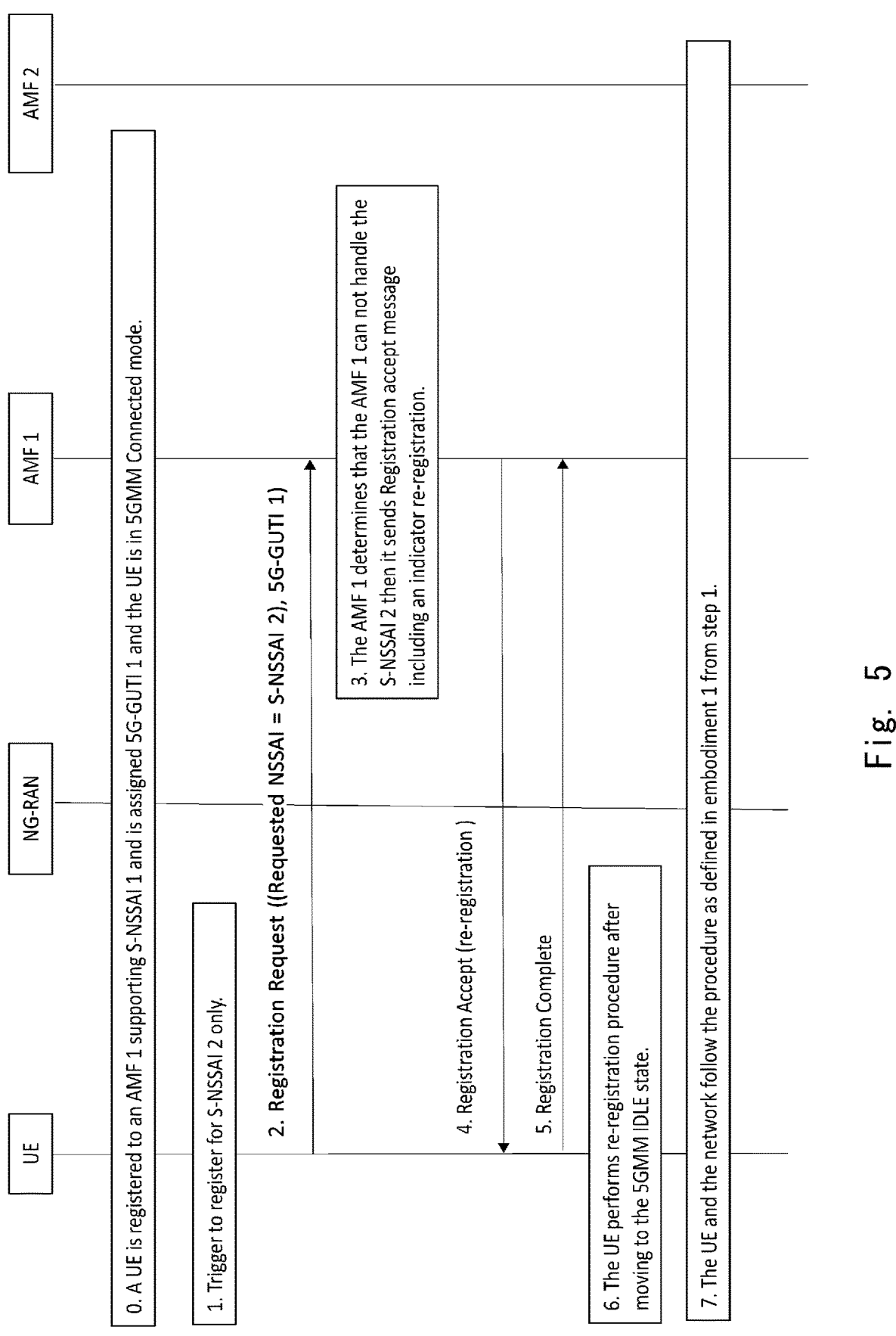
FIG. 5 illustrates an example of the registration procedure while UE is in 5GMM-CONNECTED state in an example embodiment of the present subject matter.

FIG. 5 illustrates an example of the registration procedure while UE is in 5GMM-CONNECTED state in an example embodiment of the present subject matter.

The detailed steps of the procedure is as defined below.

Step 0. The UE is configured with S-NSSAI 1 and S-NSSAI 2 which are handled by AMF 1 (only supports S-NSSAI 1) and AMF 2 (only supports S-NSSAI 2) respectively. The AMF 1 and the AMF 2 are disjoint AMFs i.e. the direct communication between the two AMFs is not possible i.e. there is no N14 interface between the old AMF and the new AMF. The AMF 1 and the AMF 2 belongs to a same PLMN.

The UE is first registered to the AMF 1 to access the services related to S-NSSAI 1. The UE is assigned a 5G-GUTI 1 by the AMF 1. The UE is in 5GMM-IDLE state. The PDU session is established for the S-NSSAI 1. I.e., the user plane is established between UPF and Data Network.

Step 1. The UE receives a trigger to register for S-NSSAI 2 only, (for example the UE receives trigger to send user data related to S-NSSAI 2 only).

Step 2. The UE sends the Registration Request message containing Requested NSSAI=S-NSSAI 2.

Step 3. Upon receiving the registration request message when the AMF 1 determines that the AMF 1 cannot handle S-NSSAI 2 due to disjoint requirement.

Step 4. The AMF sends registration accept message including a re-registration indicator to request the UE to perform the registration procedure after the UE is going to 5GMM-IDLE state. In one example, the AMF may use the registration reject message instead of the registration accept message.

Step 5. The UE upon receiving to Registration accept message containing re-registration indicator send Registration complete message to the AMF 1.

Step 6. The UE moves to the 5GMM-IDLE mode.

Step 7. Upon the UE moves to the 5GMM-IDLE mode, the UE initiates the registration procedure including requested NSSAI=S-NSSAI 2 in the registration request message. The UE and the network shall follow the registration procedure between disjoint networks. With this approach, the UE can change the access from one network slice to another network slice without service disruption.

One example, the UE initiates the registration procedure including requested NSSAI=S-NSSAI 2 in the registration request message even the UE has not moved to the 5GMM-IDLE mode. This may happen when an application using the S-NSSAI 2 make an urgent request to establish a connection.

In another example embodiment, in case the registration request message contains requested NSSAI=S-NSSAI 1+S-NSSAI 2 and the AMF determines based on the user subscription that the S-NSSAI 2 has higher priority than S-NSSAI 1, then the AMF performs this example embodiment. In this case the AMF 1 includes Allowed NSSAI=S-NSSAI 1 and Rejected S-NSSAI=S-NSSAI 2 and reject cause value set to re-registration in the Registration accept message in step 4. Upon the UE receives the Registration accept message, the UE will try to register for S-NSSAI 2 after the UE moves to the 5GMM-IDLE mode. Alternatively the AMF sends a new Information Element (IE) re-registration NSSAI set to S-NSSAI 2 in registration accept message. Upon the UE receives the Registration accept message with this IE, the UE will try to register for S-NSSAI 2 after the UE moves to the 5GMM-IDLE mode.

In another example embodiment of the present subject matter, a management scheme for disjoint networks is provided by introducing a disjoint network identifier. As explained above with reference to FIG. 1, this use case requires each disjoint networks to be totally disjointed or isolated among disjoint networks. It means that each disjoint networks are not connected each other and thus there is no direct connections. With this network environment, it is likely to have its own IP address spaces in each disjoint networks.

In order to make it possible for a communication between different disjoint networks, this example embodiments introduces a management scheme for disjoint networks by introducing a disjoint network identifier. The disjoint network identifier is used to identify a disjoint network uniquely within the PLMN. The disjoint network identifier is provided to the NG-RAN by the AMF so that the NG-RAN can maintain an association between the AMF and disjoint network identifier.

The disjoint network identifier may be assigned per AMF (I.e. AMF identifier or AMF name) or per AMF set ID depending on local configuration in the PLMN.

The disjoint network identifier can be an AMF set ID as defined in 3GPP TS 23.002 [7], AMF TNL association as defined in 3GPP TS 38.413 [6], Network identifier (NID) as defined in 3GPP TS 23.501 [4], CAG Identifier as defined in 3GPP TS 23.501 [4] or any other identifier that the PLMN can manage.

The disjoint network identifier may be expressed as isolated network identifier, separate network identifier, private network identifier or disconnected network identifier.

Figure 6:
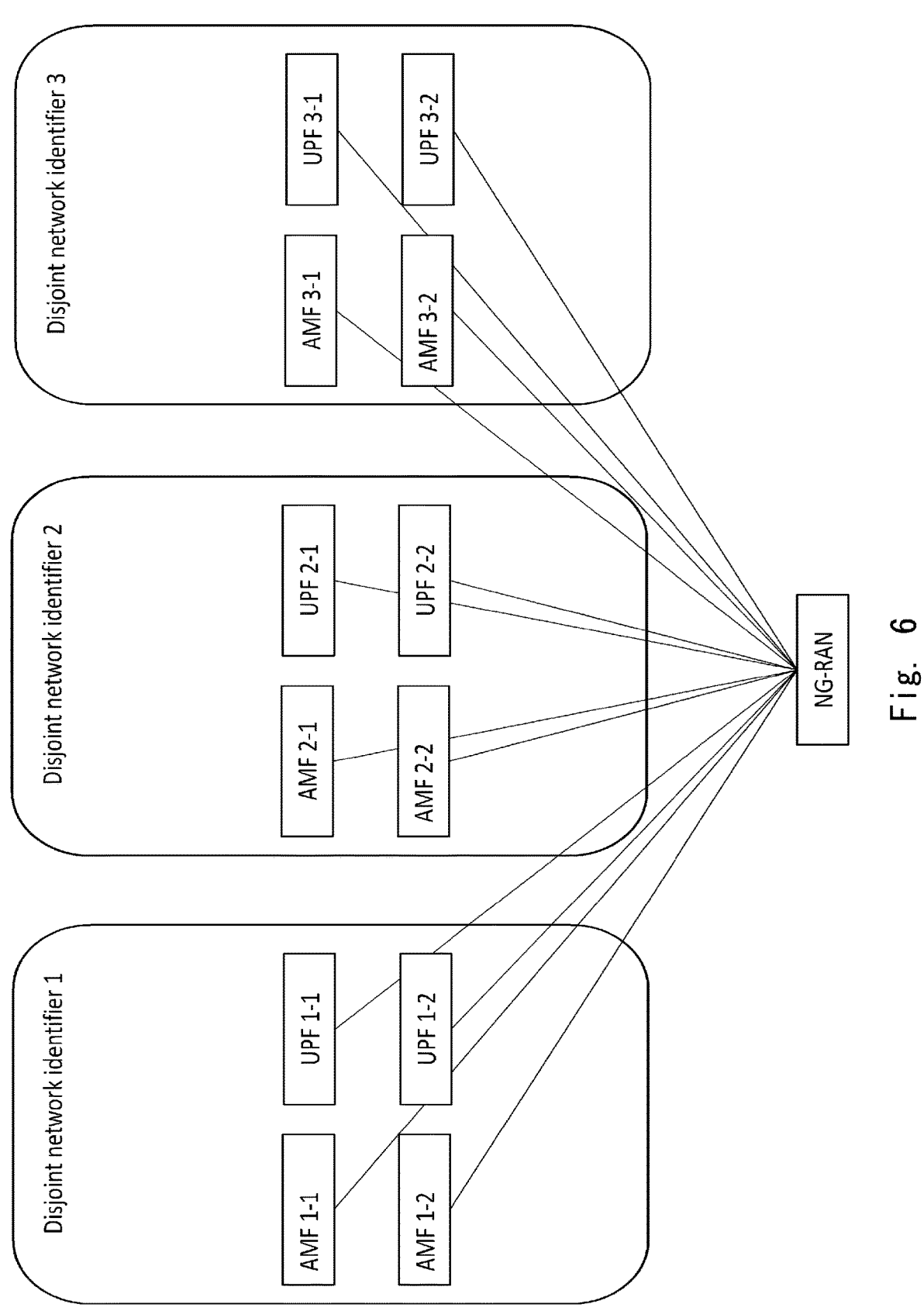
FIG. 6 illustrates the disjoint network identifier management between 5GC and NG-RAN in an example embodiment of the present subject matter.

The FIG. 6 illustrates the disjoint network identifier management between 5GC and NG-RAN in an example embodiment of the present subject matter.

Each disjoint network has its own disjoint network identifier. The disjoint network identifier is assigned by the PLMN operator. All 5GC nodes, including AMF, UPF, SMF, PCF and so on, are associated with the disjoint network identifier. Some of 5GC nodes may belong to multiple disjoint network identifiers depending on PLMN operator policy.

Each disjoint network, which is identified by the disjoint network identifier, may have its own IP address space. The IP address space can be global IP address space or local IP address space. As each disjoint network has its own IP address space, IP address may duplicate between disjoint networks.

When the N2 references point is established or updated, the AMF informs disjoint network identifier or list of disjoint network identifiers to the NG-RAN. The NG-RAN may use disjoint network identifier to use network address translation (NAT) if the N2 message traverses to a different disjoint network. The NG-RAN may use disjoint network identifier to use network address and port translation (NAPT) if the N2 message traverses to a different disjoint network.

Figure 7:
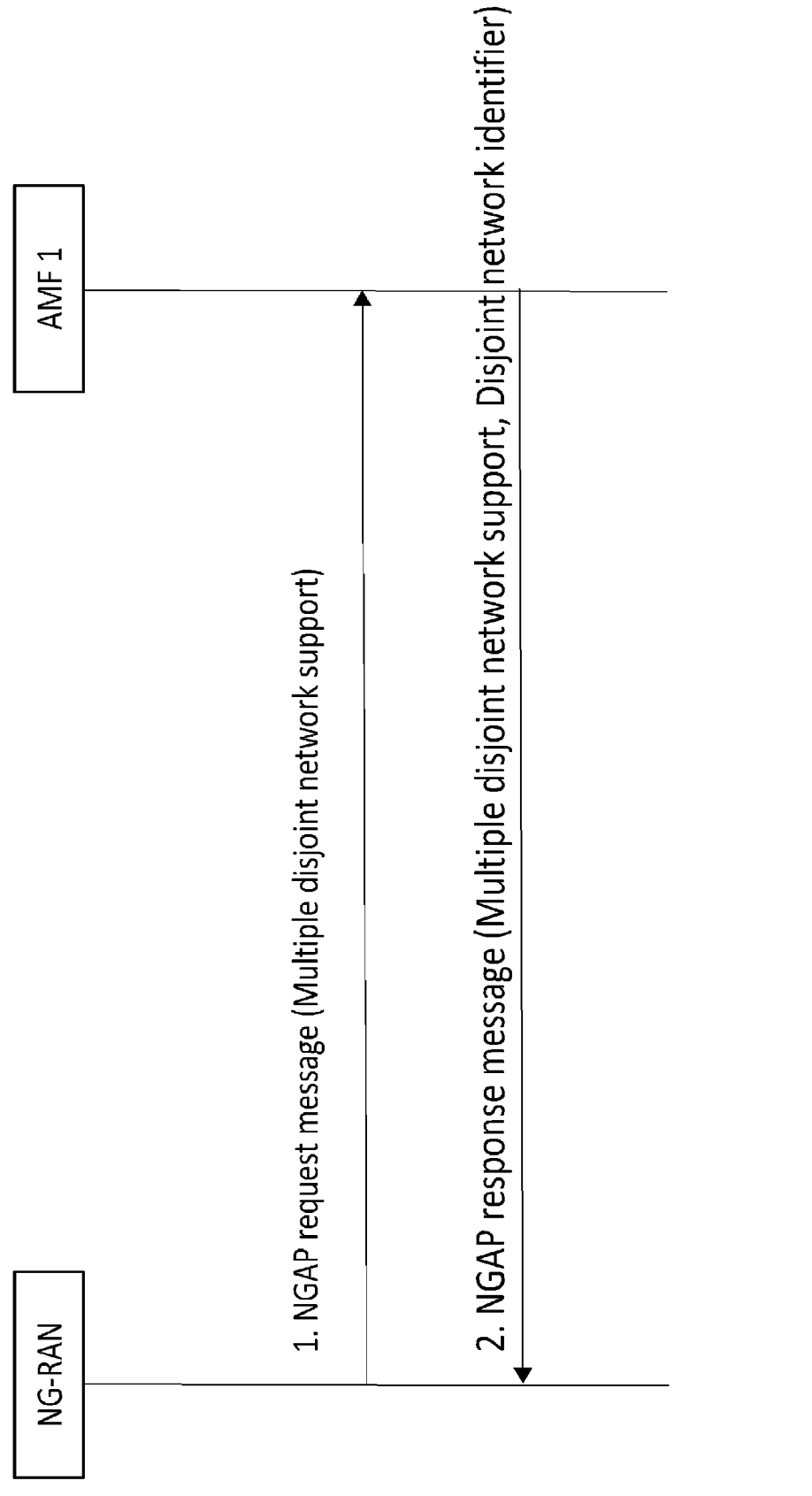
FIG. 7 illustrates a procedure where an AMF informs disjoint network identifier to the next generation radio access network (NG-RAN) triggered by the NG-RAN in an example embodiment of the present subject matter.

The FIG. 7 explains the procedure where the AMF informs disjoint network identifier to the NG-RAN triggered by the NG-RAN in an example embodiment of the present subject matter.

The detailed steps of the procedure is as defined below.

Step 1. The NG-RAN sends the NGAP request message to the AMF. The NG-RAN may indicate a multiple disjoint network support indication to the AMF. The multiple disjoint network support indication indicates that the NG-RAN supports multiple disjoint networks. The NGAP request message may be NG SETUP REQUEST message or RAN CONFIGURATION UPDATE message.

Step 2. Upon the AMF receives the NGAP request message with the multiple disjoint network support indication, the AMF sends the NGAP response message to the NG-RAN with the multiple disjoint network support indication and disjoint network identifier. The NG-RAN uses disjoint network identifier to perform NAT translation or NAPT translation for N2 message handling if the N2 message traverses to different disjoint network. The NGAP response message may be NG SETUP RESPONSE message or RAN CONFIGURATION UPDATE ACKNOWLEDGE message.

Figure 8:
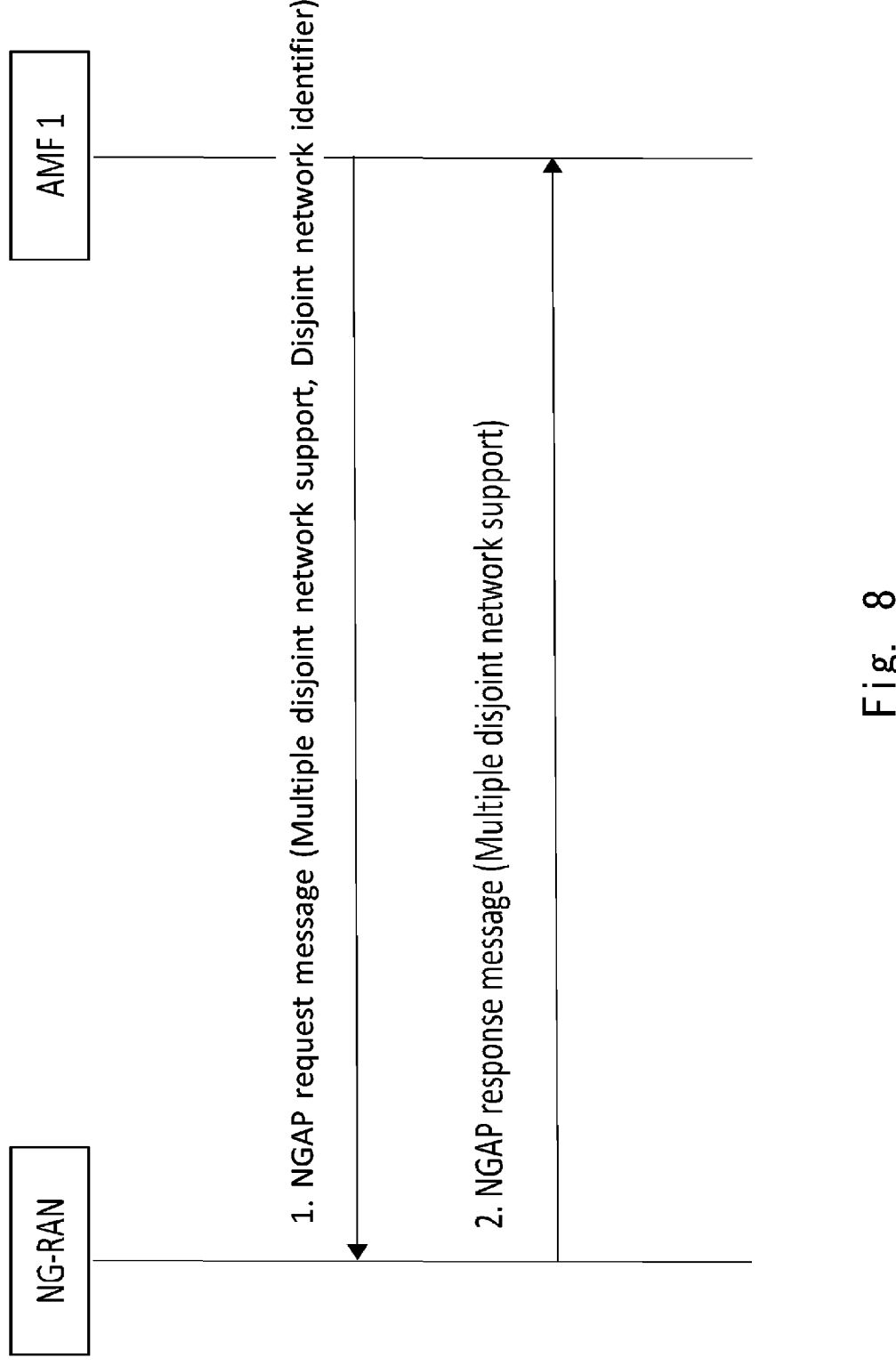
FIG. 8 illustrates a procedure where the AMF informs disjoint network identifier to the NG-RAN triggered by the AMF in an example embodiment of the present subject matter.

The FIG. 8 explains the procedure where the AMF informs disjoint network identifier to the NG-RAN triggered by the AMF.

The detailed steps of the procedure is as defined below.

Step 1. The AMF sends the NGAP request message to the NG-RAN with the multiple disjoint network support indication and disjoint network identifier. The multiple disjoint network support indication indicates that the AMF supports multiple disjoint networks. The NGAP request message may be AMF CONFIGURATION UPDATE message.

Step 2. Upon the NG-RAN receives the NGAP request message with the multiple disjoint network support indication and disjoint network identifier, the NG-RAN sends the NGAP response message to the AMF with the multiple disjoint network support indication. The NG-RAN uses disjoint network identifier to perform NAT translation or NAPT translation for N2 message handling if the N2 message traverses to different disjoint network. The NGAP response message may be CONFIGURATION UPDATE ACKNOWLEDGE message.

Figure 9:
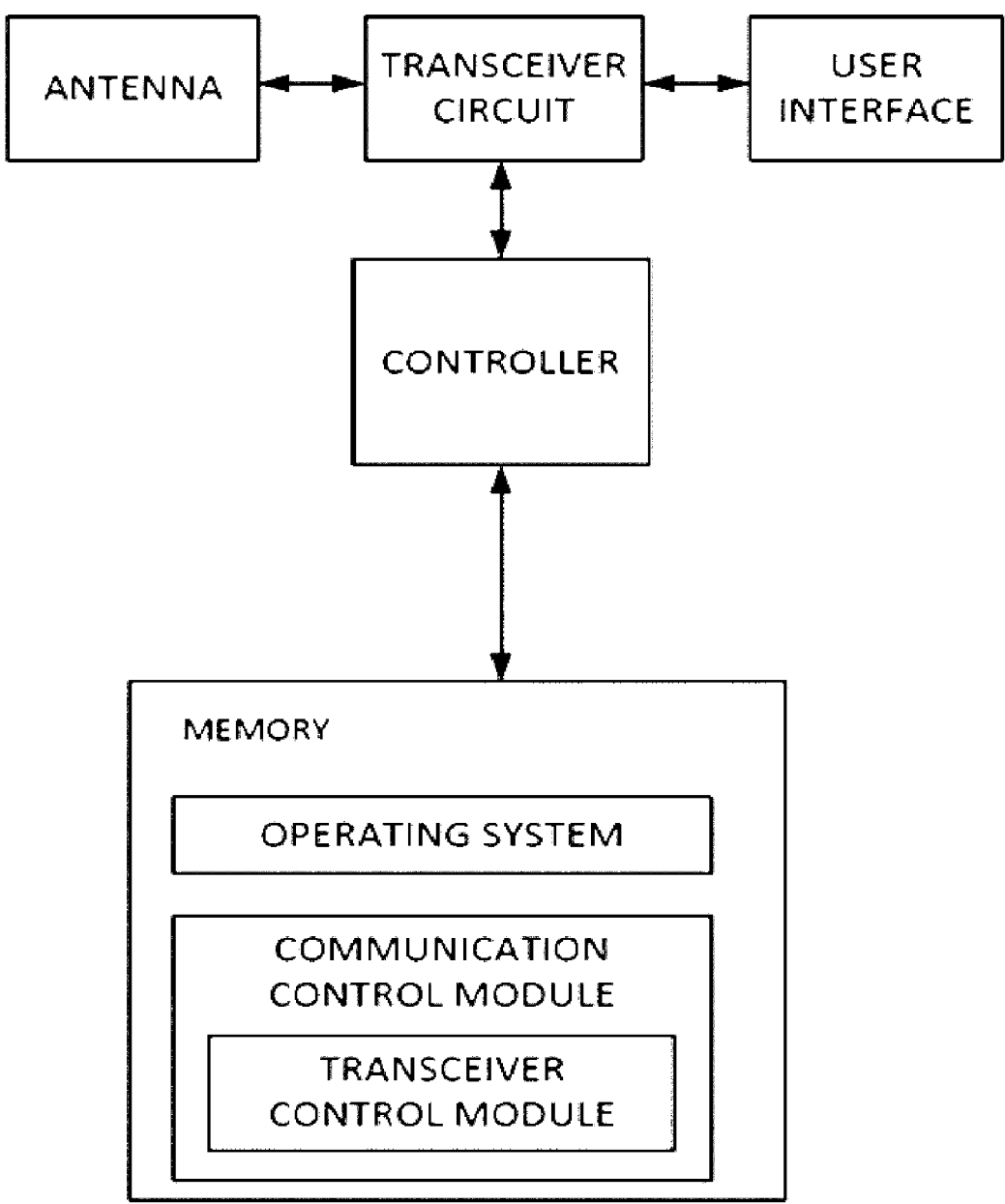
FIG. 9 illustrates a block diagram of the UE in an example embodiment of the present subject matter.

FIG. 9 shows a block diagram illustrating the main components of the UE in an example embodiment of the present subject matter. As shown, the UE includes a transceiver circuit which is operable to transmit signals to and to receive signals from the connected node(s) via one or more antenna. Although not necessarily shown in FIG. 9, the UE will of course have all the usual functionality of a conventional mobile device (such as a user interface) and this may be provided by any one or any combination of hardware, software and firmware, as appropriate. Software may be pre-installed in the memory and/or may be downloaded via the telecommunication network or from a removable data storage device (RMD), for example.

A controller controls the operation of the UE in accordance with software stored in a memory. The software includes, among other things, an operating system and a communications control module having at least a transceiver control module. The communications control module (using its transceiver control sub-module) is responsible for handling (generating/sending/receiving) signalling and uplink/downlink data packets between the UE and other nodes, such as the base station/(R)AN node, the MME, the AMF (and other core network nodes). Such signalling may include, for example, appropriately formatted signalling messages relating to connection establishment and maintenance (e.g. RRC connection establishment and other RRC messages), periodic location updates related messages (e.g. tracking area update, paging area updates, location area update) etc. Such signalling may also include, for example, broadcast information (e.g. Master Information and System information) in a receiving case.

Figure 10:
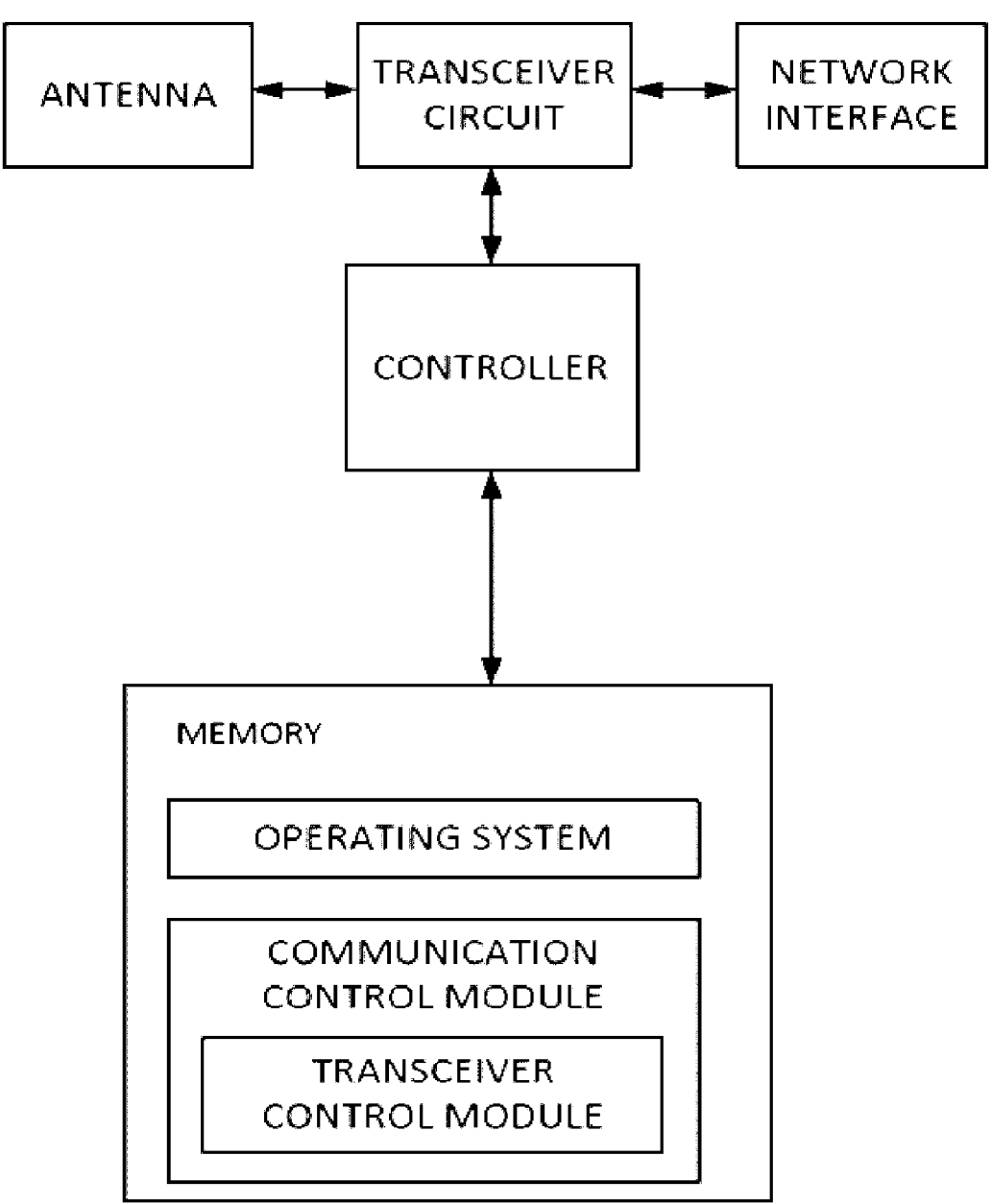
FIG. 10 illustrates a block diagram of an exemplary (R)AN node in an example embodiment of the present subject matter.

FIG. 10 is a block diagram illustrating the main components of an exemplary (R)AN node, for example a base station ('eNB' in LTE, 'gNB' in 5G) in an example embodiment of the present subject matter. As shown, the (R)AN node includes a transceiver circuit which is operable to transmit signals to and to receive signals from connected UE(s) via one or more antenna and to transmit signals to and to receive signals from other network nodes (either directly or indirectly) via a network interface. A controller controls the operation of the (R)AN node in accordance with software stored in a memory. Software may be pre-installed in the memory and/or may be downloaded via the telecommunication network or from a removable data storage device (RMD), for example. The software includes, among other things, an operating system and a communications control module having at least a transceiver control module.

The communications control module (using its transceiver control sub-module) is responsible for handling (generating/sending/receiving) signalling between the (R)AN node and other nodes, such as the UE, the MME, the AMF(e.g. directly or indirectly). The signalling may include, for example, appropriately formatted signalling messages relating to a radio connection and location procedures (for a particular UE), and in particular, relating to connection establishment and maintenance (e.g. RRC connection establishment and other RRC messages), periodic location updates related messages (e.g. tracking area update, paging area updates, location area update), S1 AP messages and NG AP messages (i.e. messages by N2 reference point), etc. Such signalling may also include, for example, broadcast information (e.g. Master Information and System information) in a sending case.

The controller is also configured (by software or hardware) to handle related tasks such as, when implemented, UE mobility estimates and/or moving trajectory estimation.

Figure 11:
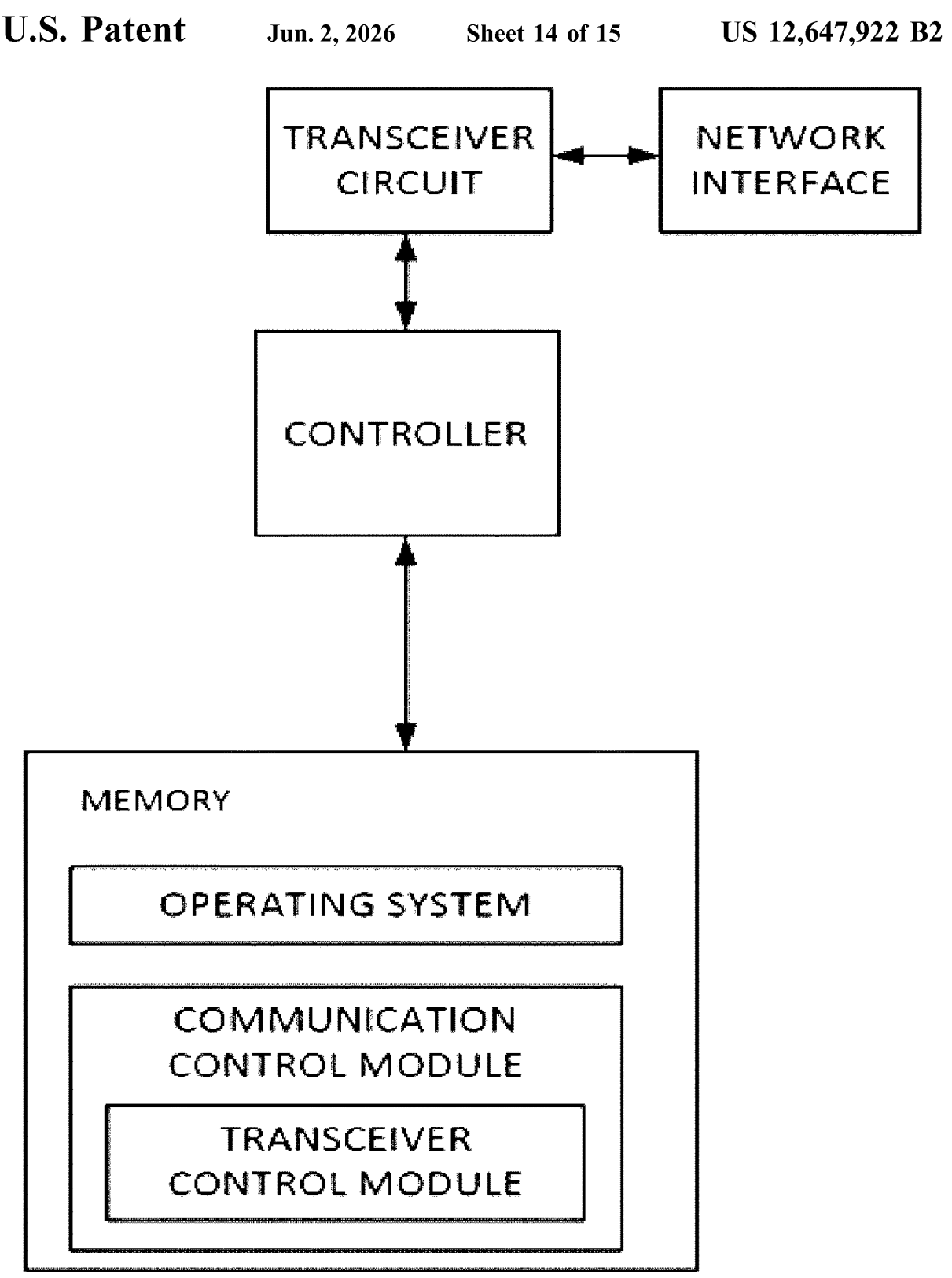
FIG. 11 illustrates a block diagram of the AMF in an example embodiment of the present subject matter.
Figure 12:
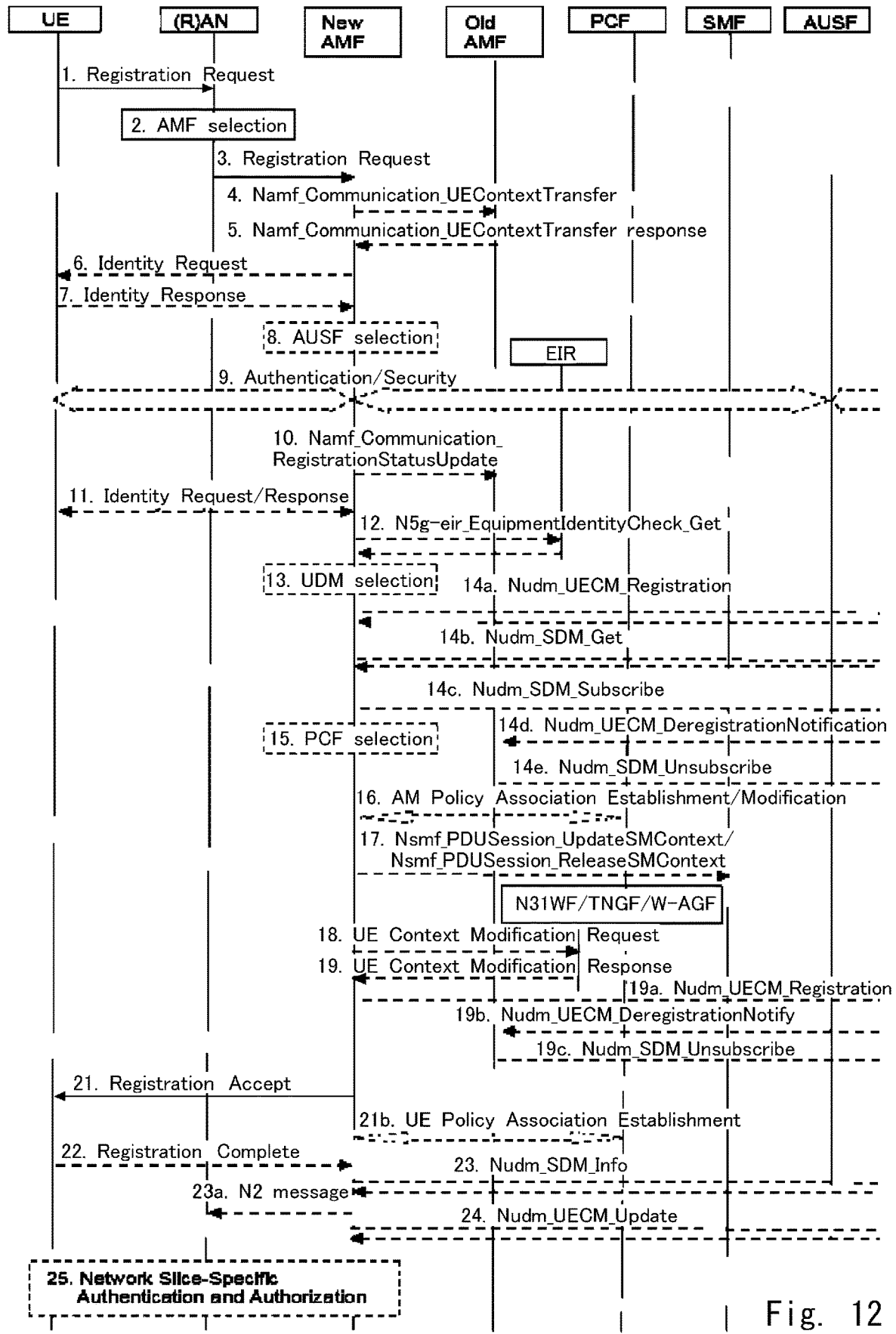
FIG. 12 illustrates a registration procedure in an example implementation of the present subject matter.

FIG. 11 is a block diagram illustrating the main components of the AMF in an example embodiment of the present subject matter. The AMF is included in the 5GC. As shown, the AMF includes a transceiver circuit which is operable to transmit signals to and to receive signals from other nodes (including the UE) via a network interface. A controller controls the operation of the AMF in accordance with software stored in a memory. Software may be pre-installed in the memory and/or may be downloaded via the telecommunication network or from a removable data storage device (RMD), for example. The software includes, among other things, an operating system and a communications control module having at least a transceiver control module.

The communications control module (using its transceiver control sub-module) is responsible for handling (generating/sending/receiving) signalling between the AMF and other nodes, such as the UE, base station/(R)AN node (e.g.

"gNB" or "eNB") (directly or indirectly). Such signalling may include, for example, appropriately formatted signalling messages relating to the procedures described herein, for example, NG AP message (i.e. a message by N2 reference point) to convey an NAS message from and to the UE, etc.

The User Equipment (or "UE", "mobile station", "mobile device" or "wireless device") in the present disclosure is an entity connected to a network via a wireless interface.

It should be noted that the UE in this specification is not limited to a dedicated communication device, and can be applied to any device, having a communication function as a UE described in this specification, as explained in the following paragraphs.

The terms "User Equipment" or "UE" (as the term is used by 3GPP), "mobile station", "mobile device", and "wireless device" are generally intended to be synonymous with one another, and include standalone mobile stations, such as terminals, cell phones, smart phones, tablets, cellular IoT devices, IoT devices, and machinery.

It will be appreciated that the terms "UE" and "wireless device" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE may, for example, be an item of transport equipment (for example transport equipment such as: rolling stocks; motor vehicles; motor cycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IoT)", using a variety of wired and/or wireless communication technologies.

Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices or Narrow Band-IoT UE (NB-IoT UE). It will be appreciated that a UE may support one or more IoT or MTC applications. Some examples of MTC applications are listed in the Table 3 (source: 3GPP TS 22.368, Annex B, the contents of which are incorporated herein by reference). This list is not exhaustive and is intended to be indicative of some examples of machine type communication applications. The list is provided below in table 1.

TABLE 1

Some examples of machine-type communication applications.

| Service Area | MTC Applications |
|---|---|
| Security | Surveillance systems |
| | Backup for landline |
| | Control of physical access (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |

17

TABLE 1-continued

Some examples of machine-type communication applications.

| Service Area | MTC Applications |
|---|---|
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote | Sensors |
| Maintenance/Control | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | eBook |

Applications, services, and solutions may be an MVNO (Mobile Virtual Network Operator) service, an emergency radio communication system, a PBX (Private Branch eXchange) system, a PHS/Digital Cordless Telecommunications system, a POS (Point of sale) system, an advertise calling system, an MBMS (Multimedia Broadcast and Multicast Service), a V2X (Vehicle to Everything) system, a train radio system, a location related service, a Disaster/ Emergency Wireless Communication Service, a community service, a video streaming service, a femto cell application service, a VoLTE (Voice over LTE) service, a charging service, a radio on demand service, a roaming service, an activity monitoring service, a telecom carrier/communication NW selection service, a functional restriction service, a PoC (Proof of Concept) service, a personal information management service, an ad-hoc network/DTN (Delay Tolerant Networking) service, etc.

Further, the above-described UE categories are merely examples of applications of the technical ideas and exemplary embodiments described in the present document. Needless to say, these technical ideas and embodiments are not limited to the above-described UE and various modifications can be made thereto.

While the disclosure has been particularly shown and described with reference to exemplary embodiments thereof, the disclosure is not limited to these embodiments. It will be understood by those of ordinary skill in the art that various changes in form and details may be made therein without departing from the spirit and scope of the present disclosure as defined by this document. For example, the embodiments above are not limited to 5GS, and the embodiments are also applicable to communication system other than 5GS.

The whole or part of the example embodiments disclosed above can be described as, but not limited to, the following supplementary notes.

Supplementary note 1.

A method of second core network apparatus comprising:

receiving, from a Radio Access Network (RAN), an Initial Radio terminal message, determining whether a Radio terminal context can be obtained, sending, to the RAN, a Reroute request,

receiving a Reroute transfer message from the RAN; and sending, to a Radio terminal, Registration Accept message.

Supplementary note 2.

A method of first core network apparatus comprising:

receiving, from a Radio Access Network (RAN), a Reroute transfer message, suspending Protocol Data Unit (PDU) session, sending, to a third core network apparatus, a PDU session related Request message, receiving from the third core network apparatus, a PDU session related Response message; and sending, to the NG-RAN, a Reroute request message, wherein the Reroute request message is sent to the RAN before the second core network apparatus sends, to a Radio terminal, a Registration Accept message.

Supplementary note 3.

A method of first core network apparatus comprising:

receiving, from Radio Access Network (RAN), an Initial Radio terminal message, determining whether a Radio terminal context can be obtained, sending, to the RAN, a Reroute request message, receiving, from the RAN, a Reroute transfer message, sending, to third core network apparatus, Request message related to PDU session; and receiving, from the third core network apparatus, Response message related to the Protocol Data Unit (PDU) session, wherein the Response message related to the PDU session is received, before a second core network apparatus sends, to a Radio terminal, a Registration Accept message.

Supplementary note 4.

A method of first core network apparatus comprising:

receiving a Registration Request from a Radio terminal, determining the first core network apparatus does not handle network slice related to a second core network apparatus, sending a Registration Accept message to the Radio terminal; and receiving a Registration Complete message from the Radio terminal.

Supplementary note 5.

A method of Radio Access Network comprising:

sending, to a first core network apparatus, a request message including an information related to multiple disjoint network; and receiving, from the first core network apparatus, a response message including an information related to multiple disjoint network and an identifier related to the disjoint network.

Supplementary note 6.

A method of first core network apparatus comprising:

sending, to a Radio Access Network, a request message including an information related to multiple disjoint network and an identifier related to the disjoint network; and receiving, from the Radio Access Network, a response message including an information related to multiple disjoint network.

Supplementary note 7.

The method according to any one of Supplementary notes 1 to 4, wherein the second core network apparatus is second Access and Mobility Management Function (AMF).

Supplementary note 8.

The method according to any one of Supplementary notes 2 to 6, wherein the first core network apparatus is first Access and Mobility Management Function (AMF).

Supplementary note 9.

The method according to Supplementary note 2, further comprising:

suspending user plane by the third core network apparatus.

Supplementary note 10.

The method according to Supplementary note 3, further comprising: resuming user plane by the third core network apparatus.

Supplementary note 11.

The method according to Supplementary note 2, Supplementary note 3, Supplementary note 9, or Supplementary note 10, wherein the third core network apparatus is SMF (Session Management Function).

Supplementary note 12.

The method according to any one of Supplementary notes 1 to 4, wherein the Radio terminal is second User Equipment (UE).

The whole or part of the example embodiments disclosed above can be described as, but not limited to, the following.

General Registration

The UE is configured with a S-NSSAI 1 and a S-NSSAI 2. The S-NSSAI 1 and S-NSSAI are disjoint slices i.e. it is supported in two different AMFs (old AMF supports S-NS-SAI 1 and the new AMF supports S-NSSAI 2). There is no interface between old AMF 1 and the new AMF i.e. the old AMF and the new AMF cannot communicate directly and then belong to same registration area. The old AMF is AMF 1 and the new AMF is AMF 2 in the procedure below.

Step 0. The UE is registered to an old AMF for an S-NSSAI 1 and has been assigned 5G-GUTI 1. The allowed NSSAI consists of S-NSSAI 1 only. The UE receives a trigger to initiate services related to S-NSSAI 2 only.

Step 1. UE to (R)AN: AN message (AN parameters, Registration Request (Registration type, SUCI or 5G-GUTI 1 or PEI, [last visited TAI (if available)], Security parameters, [Requested NSSAI], [Mapping Of Requested NSSAI], [Default Configured NSSAI Indication], [UE Radio Capability Update], [UE MM Core Network Capability], [PDU Session status], [List Of PDU Sessions To Be Activated], [Follow-on request], [MICO mode preference], [Requested Active Time], [Requested DRX parameters for E-UTRA and NR], [Requested DRX parameters for NB-IoT], [extended idle mode DRX parameters], [LADN DNN(s) or Indicator Of Requesting LADN Information], [NAS message container], [Support for restriction of use of Enhanced Coverage], [Preferred Network Behaviour], [UE paging probability information], [UE Policy Container (the list of PSIs, indication of UE support for ANDSP and the operating system identifier)] and [UE Radio Capability ID], PEI)).

NOTE 1: The UE Policy Container and its usage is defined in TS 23.503 [20].

The Requested NSSAI is set to S-NSSAI 2.

In the case of NG-RAN, the AN parameters include e.g. 5G-S-TMSI or GUAMI, the Selected PLMN ID (or PLMN ID and NID, see TS 23.501 [2], clause 5.30) and NSSAI information, the AN parameters also include Establishment cause. The Establishment cause provides the reason for requesting the establishment of an RRC connection. Whether and how the UE includes the NSSAI information as part of the AN parameters is dependent on the value of the Access Stratum Connection Establishment NSSAI Inclusion Mode parameter, as specified in clause 5.15.9 of TS 23.501 [2].

The AN parameters shall also include an IAB-Indication if the UE is an IAB-node accessing 5GS.

The Registration type indicates if the UE wants to perform an Initial Registration (i.e. the UE is in RM-DEREG-ISTERED state), a Mobility Registration Update (i.e. the UE is in RM-REGISTERED state and initiates a Registration procedure due to mobility or due to the UE needs to update its capabilities or protocol parameters, or to request a change of the set of network slices it is allowed to use), a Periodic Registration Update (i.e. the UE is in RM-REGISTERED state and initiates a Registration procedure due to the Periodic Registration Update timer expiry, see clause 4.2.2.2.1) or an Emergency Registration (i.e. the UE is in limited service state).

When the UE is using E-UTRA, the UE indicates its support of CIoT 5GS Optimisations, which is relevant for the AMF selection, in the RRC connection establishment signalling associated with the Registration Request.

When the UE is performing an Initial Registration the UE shall indicate its UE identity in the Registration Request message as follows, listed in decreasing order of preference in the case of registration with a PLMN:

i) a 5G-GUTI mapped from an EPS GUTI, if the UE has a valid EPS GUTI.

ii) a native 5G-GUTI assigned by the PLMN to which the UE is attempting to register, if available;

iii) a native 5G-GUTI assigned by an equivalent PLMN to the PLMN to which the UE is attempting to register, if available;

iv) a native 5G-GUTI assigned by any other PLMN, if available.

NOTE 2: This can also be a 5G-GUTIs assigned via another access type.

v) Otherwise, the UE shall include its SUCI in the Registration Request as defined in TS 33.501 [15].

When the UE performing an Initial Registration has both a valid EPS GUTI and a native 5G-GUTI, the UE shall also indicate the native 5G-GUTI as Additional GUTI. If more than one native 5G-GUTIs are available, the UE shall select the 5G-GUTI in decreasing order of preference among items (ii)-(iv) in the list above.

When registering with an SNPN with 5G-GUTI as UE identity, the UE shall only use the 5G-GUTI previously assigned by the same SNPN.

The NAS message container shall be included if the UE is sending a Registration Request message as an Initial NAS message and the UE has a valid 5G NAS security context and the UE needs to send non-cleartext IEs, see clause 4.4.6 in TS 24.501 [25]. If the UE does not need to send non-cleartext IEs, the UE shall send a Registration Request message without including the NAS message container.

If the UE does not have a valid 5G NAS security context, the UE shall send the Registration Request message without including the NAS message container. The UE shall include the entire Registration Request message (i.e. containing cleartext IEs and non-cleartext IEs) in the NAS message container that is sent as part of the Security Mode Complete message in step 9b.

When the UE is performing an Initial Registration (i.e., the UE is in RM-DEREGISTERED state) with a native 5G-GUTI then the UE shall indicate the related GUAMI information in the AN parameters. When the UE is performing an Initial Registration with its SUCI, the UE shall not indicate any GUAMI information in the AN parameters.

When the UE is performing an Initial Registration or a Mobility Registration and if CIoT 5GS Optimisations are supported the UE shall indicate its Preferred Network Behaviour (see TS 23.501 [2] clause 5.31.2). If S1 mode is supported the UE's EPC Preferred Network Behaviour is included in the S1 UE network capabilities in the Registration Request message, see TS 24.501 [25], clause 8.2.6.1.

For an Emergency Registration, the SUCI shall be included if the UE does not have a valid 5G-GUTI available; the PEI shall be included when the UE has no SUPI and no valid 5G-GUTI. In other cases, the 5G-GUTI is included and it indicates the last serving AMF.

The UE may provide the UE's usage setting based on its configuration as defined in TS 23.501 [2] clause 5.16.3.7. The UE provides Requested NSSAI as described in TS 23.501 [2] clause 5.15.5.2.1, and in the case of Initial Registration or Mobility Registration Update, the UE includes the Mapping Of Requested NSSAI (if available), which is the mapping of each S-NSSAI of the Requested NSSAI to the HPLMN S-NSSAIs, to ensure that the network is able to verify whether the S-NSSAI(s) in the Requested NSSAI are permitted based on the Subscribed S-NSSAIs. In the case of inter PLMN mobility, if the serving PLMN S-NSSAI(s) corresponding to the established PDU Session (s) are not present in the UE, the associated HPLMN S-NSSAI(s) associated with the established PDU Session(s) shall be provided in the Mapping Of Requested NSSAI as described in the clause 5.15.5.2.1 TS 23.501 [2].

The UE includes the Default Configured NSSAI Indication if the UE is using a Default Configured NSSAI, as defined in TS 23.501 [2].

The UE may include UE paging probability information if it supports the assignment of WUS Assistance Information from the AMF (see TS 23.501 [2]).

In the case of Mobility Registration Update, the UE includes in the List Of PDU Sessions To Be Activated the PDU Sessions for which there are pending uplink data. When the UE includes the List Of PDU Sessions To Be Activated, the UE shall indicate PDU Sessions only associated with the access the Registration Request is related to. As defined in TS 24.501 the UE shall include always-on PDU Sessions which are accepted by the network in the List Of PDU Sessions To Be Activated even if there are no pending uplink data for those PDU Sessions.

NOTE 3: A PDU Session corresponding to a LADN is not included in the List Of PDU Sessions To Be Activated when the UE is outside the area of availability of the LADN.

The UE MM Core Network Capability is provided by the UE and handled by AMF as defined in TS 23.501 [2] clause 5.4.4a. The UE includes in the UE MM Core Network Capability an indication if it supports Request Type flag "handover" for PDN connectivity request during the attach procedure as defined in clause 5.17.2.3.1 of TS 23.501 [2]. If the UE supports 'Strictly Periodic Registration Timer Indication', the UE indicates its capability of 'Strictly Periodic Registration Timer Indication' in the UE MM Core Network Capability. If the UE supports CAG, the UE indicates its capability of "CAG supported" in the UE MM Core Network Capability.

The UE may provide either the LADN DNN(s) or an Indication Of Requesting LADN Information as described in TS 23.501 [2] clause 5.6.5.

If available, the last visited TAI shall be included in order to help the AMF produce Registration Area for the UE.

The Security parameters are used for Authentication and integrity protection, see TS 33.501 [15]. Requested NSSAI indicates the Network Slice Selection Assistance Information (as defined in clause 5.15 of TS 23.501 [2]). The PDU Session status indicates the previously established PDU Sessions in the UE. When the UE is connected to the two AMFs belonging to different PLMN via 3GPP access and non-3GPP access then the PDU Session status indicates the established PDU Session of the current PLMN in the UE.

The Follow-on request is included when the UE has pending uplink signalling and the UE doesn't include List Of PDU Sessions To Be Activated, or the Registration type indicates the UE wants to perform an Emergency Registration. In Initial Registration and Mobility Registration Update, UE provides the UE Requested DRX parameters, as defined in clause 5.4.5 of TS 23.501 [2]. The UE may provide the extended idle mode DRX parameters as defined in clause 5.31.7.2 of TS 23.501 [2] to request extended idle mode DRX.

The UE provides UE Radio Capability Update indication as described in TS 23.501 [2].

The UE includes the MICO mode preference and optionally a Requested Active Time value if the UE wants to use MICO Mode with Active Time.

The UE may indicate its Service Gap Control Capability in the UE MM Core Network Capability, see TS 23.501 [2] clause 5.31.16.

For a UE with a running Service Gap timer in the UE, the UE shall not set Follow-on Request indication or Uplink data status in the Registration Request message (see TS 23.501 [2] clause 5.31.16), except for network access for regulatory prioritized services like Emergency services or exception reporting.

If UE supports RACS and has been assigned UE Radio Capability ID(s), the UE shall indicate a UE Radio Capability ID as defined in TS 23.501 [2] clause 5.4.4.1a as non-cleartext IE.

The PEI may be retrieved in initial registration from the UE as described in clause 4.2.2.2.1.

Step 2. If a 5G-S-TMSI or GUAMI is not included or the 5G-S-TMSI or GUAMI does not indicate a valid AMF or the (R)AN determines that AMF indicated by 5G-S-TMSI or GUAMI does not support the Requested NSSAI, then the (R)AN, based on (R)AT and Requested NSSAI, if available, selects an AMF. The (R)AN selects the new AMF.

The (R)AN selects an AMF as described in TS 23.501 [2], clause 6.3.5. If UE is in CM-CONNECTED state, the (R)AN can forward the Registration Request message to the AMF based on the N2 connection of the UE.

If the (R)AN cannot select an appropriate AMF, it forwards the Registration Request to an AMF which has been configured, in (R)AN, to perform AMF selection.

Step 3. (R)AN to new AMF: N2 message (N2 parameters, Registration Request (as described in step 1) and [LTE-M Indication].

When NG-RAN is used, the N2 parameters include the Selected PLMN ID (or PLMN ID and NID, see TS 23.501 [2], clause 5.30), Location Information and Cell Identity related to the cell in which the UE is camping, UE Context Request which indicates that a UE context including security information needs to be setup at the NG-RAN.

When NG-RAN is used, the N2 parameters shall also include the Establishment cause and IAB-Indication if the indication is received in AN parameters in step 1.

Mapping Of Requested NSSAI is provided only if available.

If the Registration type indicated by the UE is Periodic Registration Update, then steps 4 to 19 may be omitted.

When the Establishment cause is associated with priority services (e.g. MPS, MCS), the AMF includes a Message Priority header to indicate priority information. Other NFs relay the priority information by including the Message Priority header in service-based interfaces, as specified in TS 29.500 [17].

The RAT Type the UE is using is determined (see clause 4.2.2.2.1) and based on it the AMF determines whether the UE is performing Inter-RAT mobility to or from NB-IoT. If the AMF receives the LTE M indication, then it considers that the RAT Type is LTE-M and stores the LTE-M Indication in UE Context.

If a UE includes a Preferred Network Behaviour, this defines the Network Behaviour the UE supports and is expecting to be available in the network as defined in TS 23.501 [2], clause 5.31.2.

If the UE has included the Preferred Network Behaviour, and what the UE indicated it supports in Preferred Network Behaviour is incompatible with the network support, the AMF shall reject the Registration Request with an appropriate cause value (e.g. one that avoids retries on this PLMN).

If there is a Service Gap timer running in the UE Context in AMF for the UE, and Follow-on Request indication or Uplink data status is included in the Registration Request message, the AMF shall ignore the Follow-on Request indication and Uplink data status and not perform any of the actions related to the status.

If the UE has included a UE Radio Capability ID in step 1 and the AMF supports RACS, the AMF stores the Radio Capability ID in UE context.

Step 4. [Conditional] new AMF to old AMF: Namf_Communication_UEContextTransfer (complete Registration Request) or new AMF to UDSF: Nudsf_Unstructured Data Management_Query( ) (With UDSF Deployment): If the UE's 5G-GUTI was included in the Registration Request and the serving AMF has changed since last Registration procedure, new AMF and old AMF are in the same AMF Set and UDSF is deployed, the new AMF retrieves the stored UE's SUPI and UE context directly from the UDSF using Nudsf_UnstructuredData-Management_Query service operation or they can share stored UE context via implementation specific means if UDSF is not deployed. This includes also event subscription information by each NF consumer for the given UE. In this case, the new AMF uses integrity protected complete Registration request NAS message to perform and verify integrity protection.

(Without UDSF Deployment): If the UE's 5G-GUTI was included in the Registration Request and the serving AMF has changed since last Registration procedure, the new AMF may invoke the Namf_Communication_UEContextTransfer service operation on the old AMF including the complete Registration Request NAS message, which may be integrity protected, as well as the Access Type, to request the UE's SUPI and UE Context. See clause 5.2.2.2.2 for details of this service operation. In this case, the old AMF uses either 5G-GUTI and the integrity protected complete Registration request NAS message, or the SUPI and an indication that the UE is validated from the new AMF, to verify integrity protection if the context transfer service operation invocation corresponds to the UE requested. The old AMF also transfers the event subscriptions information by each NF consumer, for the UE, to the new AMF. If the old AMF has not yet reported a non-zero MO Exception Data Counter to the (H-)SMF, the Context Response also includes the MO Exception Data Counter.

If the 5G-GUTI 1 was included in the registration request message and the new AMF determines that the new AMF has no interface with the old AMF corresponding to the GUAMI of the 5G-GUTI 1, the new AMF sends Namf_Communication_UEContextTransfer service operation using following steps.

Step 4a. If the AMF 2 determines that the UE contexts can be obtained from the AMF 1 (e.g. old AMF) via the NG-RAN based on local configuration, the AMF 2 sends a Reroute_N14_Request message containing 5G-GUTI 1, AMF 2 address (e.g. IP address or FQDN of the AMF 2), N14 message container (Namf_Communication_UEContextTransfer Request) to the NG-RAN. The AMF 2 address information that can be routable from any disjoint networks may be configured in the AMF 2 or the AMF 2 obtains it from the NRF as described in section 6.3.5 of 3GPP TS 23.501 [4]. Alternately, the AMF 2 assigns a new 5G-GUTI to the UE and set it in the Reroute_N14_Request message.

Step 4b. When the NG-RAN receives the Reroute_N14_Request message, the NG-RAN sends the Reroute_N14_transfer message containing the AMF 2 address or/and the new 5G-GUTI and the N14 message container (Namf_Communication_UEContextTransfer) to the AMF 1. The AMF address is derived from the GUAMI part of the 5G-GUTI. The NG-RAN may store address of AMF 2.

Note that the NG-RAN may need to manage multiple IP address spaces per disjoint networks. For example, an IP address derived from a GUAMI part of the 5G-GUTI may only be valid in such disjoint network.

Note that the NG-RAN may have a Network Address Translation (NAT) function to support multiple disjoint networks. If any messages over N2 and N3 reference points needs to traverse different disjoint networks, the NG-RAN performs the NAT function to make it possible to communicate between AMFs and between UPFs that are located in different disjoint networks.

Step 4a) In case the user plane has been established for a PDU session related to the S-NSSAI 1 then the AMF suspend the user plane by initiating Nsmf_PDUSession_Up-dateSMContext Request (PDU Session ID, Cause, Operation type, User Location Information, Age of Location Information, N2 SM Information (Secondary RAT usage data), suspension timer) to the SMF 1. The Operation Type is set to "UP Suspend" to indicate suspend of user plane resources for the PDU Session.

Step 4b) The SMF 1 initiates an N4 Session Modification procedure by sending N4 Session Modification Request (Buffering on/off) message to the UPF 1 indicating the need to buffer the data at the UPF 1 coming from Data Network if the buffering is indicated otherwise no need to buffer the data. If the suspend timer is included in the message, The SMF starts the suspension timer in the SMF.

If the suspension timer expires, the SMF initiates the PDU Session Release procedure as described in the section 4.3.4 of 3GPP TS 23.502 [5].

The UPF 1 sends N4 Session Modification Response to acknowledge the SMF 1's request.

If the old AMF has PDU Sessions for another access type (different from the Access Type indicated in this step) and if the old AMF determines that there is no possibility for relocating the N2 interface to the new AMF, the old AMF returns UE's SUPI and indicates that the Registration Request has been validated for integrity protection, but does not include the rest of the UE context.

For inter PLMN mobility, UE Context information includes HPLMN S-NSSAIs corresponding to the Allowed NSSAI for each Access Type, without Allowed NSSAI of old PLMN.

NOTE 4: The new AMF Sets the indication that the UE is validated according to step 9a, if the new AMF has performed successful UE authentication after previous integrity check failure in the old AMF.

NOTE 5: The NF consumers do not need to subscribe for the events once again with the new AMF after the UE is successfully registered with the new AMF.

If the new AMF has already received UE contexts from the old AMF during handover procedure, then step 4,5 and 10 shall be skipped.

For an Emergency Registration, if the UE identifies itself with a 5G-GUTI that is not known to the AMF, steps 4 and 5 are skipped and the AMF immediately requests the SUPI from the UE. If the UE identifies itself with PEI, the SUPI request shall be skipped. Allowing Emergency Registration without a user identity is dependent on local regulations.

Step 5. [Conditional] old AMF to new AMF: Response to Namf_Communication_UEContextTransfer (SUPI, UE Context in AMF (as per Table 5.2.2.2.2-1)) or UDSF to new AMF: Nudsf_Unstructured Data Management_Query( ) The old AMF may start an implementation specific (guard) timer for the UE context.

If the UDSF was queried in step 4, the UDSF responds to the new AMF for the Nudsf_Unstructured Data Management_Query invocation with the related contexts including established PDU Sessions, the old AMF includes SMF information DNN, S-NSSAI(s) and PDU Session ID, active NGAP UE-TNLA bindings to N3IWF/TNGF/W-AGF, the old AMF includes information about the NGAP UE-TNLA bindings. If the Old AMF was queried in step 4, Old AMF responds to the new AMF for the Namf_Communication-_UEContextTransfer invocation by including the UE's SUPI and UE Context.

If old AMF holds information about established PDU Session(s) and it is not an Initial Registration, the old AMF includes SMF information, DNN(s), S-NSSAI(s) and PDU Session ID(s).

If old AMF holds UE context established via N3IWF, W-AGF or TNGF, the old AMF includes the CM state via N3IWF, W-AGF or TNGF. If the UE is in CM-CONNECTED state via N3IWF, W-AGF or TNGF, the old AMF includes information about the NGAP UE-TNLA bindings.

If old AMF fails the integrity check of the Registration Request NAS message, the old AMF shall indicate the integrity check failure. If the new AMF is configured to allow emergency services for unauthenticated UE, the new AMF behaves as follows:

If the UE has only an emergency PDU Session, the AMF either skips the authentication and security procedure or accepts that the authentication may fail and continues the Mobility Registration Update procedure; or If the UE has both emergency and non emergency PDU Sessions and authentication fails, the AMF continues the Mobility Registration Update procedure and deactivates all the non-emergency PDU Sessions as specified in clause 4.3.4.2.

NOTE 6: The new AMF can determine if a PDU Session is used for emergency service by checking whether the DNN matches the emergency DNN.

If old AMF holds information about AM Policy Association and the information about UE Policy Association (i.e.

the Policy Control Request Trigger for updating UE Policy as defined in TS 23.503 [20]), the old AMF includes the information about the AM Policy Association, the UE Policy Association and PCF ID. In the roaming case, V-PCF ID and H-PCF ID are included.

During inter PLMN mobility, the handling of the UE Radio Capability ID in the new AMF is as defined in TS 23.501 [2].

The AMF 1 sends the Reroute_N14_Request message containing the containing AMF 2 address (e.g. IP address or FQDN of the AMF 2) or/and new 5G-GUTI and N14 message container (Namf_Communication_UEContext-Transfer Response) to the NG-RAN. The Namf_Communication_UEContextTransfer Response contains the UE context.

When the NG-RAN receives the Reroute_N14_Request message, the NG-RAN sends the Reroute_N14_transfer message containing the N14 message container (Namf_Communication_UEContextTransfer Response) to the AMF 2. AMF2 address or/and the new 5G-GUTI may be set in the Reroute_N14_transfer message containing the N14 message container (Namf_Communication_UEContext-Transfer Response). If the new 5G-GUTI is set in the NG-RAN receives the Reroute_N14_Request message, the AMF 2 address is derived from the GUAMI part of the new 5G-GUTI.

Step 5a. If the AMF 1 receives the list of PDU sessions to be resumed IE in the Registration request message in step 4 or based on local information, The AMF 1 sends Nsmf_P-DUSession_UpdateSMContext Request (Resume request, PDU session ID) to the SMF 1.

Step 5b. The SMF 1 resumes the user plane for each PDU session by sending N4 Session Modification Request for each PDU session to the UPF 1. The UPF 1, after resuming the user plane, sends N4 Session Modification Response message to the SMF 1.

Step 5c. The SMF 1 sends Nsmf_PDUSession_UpdateSMContext Response to the AMF 1.

Note that steps 10 to 12 in the FIG. 4A and FIG. 4B are equivalent with the steps 5 to 7 in the FIG. 4.8.2.3-1: Connection Resume in CM-IDLE with Suspend in 3GPP TS 23.502 [5]

NOTE 7: When new AMF uses UDSF for context retrieval, interactions between old AMF, new AMF and UDSF due to UE signalling on old AMF at the same time is implementation issue.

Step 6. [Conditional] new AMF to UE: Identity Request ( ).

If the SUCI is not provided by the UE nor retrieved from the old AMF the Identity Request procedure is initiated by AMF sending an Identity Request message to the UE requesting the SUCI.

Step 7. [Conditional] UE to new AMF: Identity Response ( ).

The UE responds with an Identity Response message including the SUCI. The UE derives the SUCI by using the provisioned public key of the HPLMN, as specified in TS 33.501 [15].

Step 8. The AMF may decide to initiate UE authentication by invoking an AUSF. In that case, the AMF selects an AUSF based on SUPI or SUCI, as described in TS 23.501 [2], clause 6.3.4.

If the AMF is configured to support Emergency Registration for unauthenticated SUPIs and the UE indicated Registration type Emergency Registration, the AMF skips the authentication or the AMF accepts that the authentication may fail and continues the Registration procedure.

Step 9a. If authentication is required, the AMF requests it from the AUSF; if Tracing Requirements about the UE are available at the AMF, the AMF provides Tracing Requirements in its request to AUSF. Upon request from the AMF, the AUSF shall execute authentication of the UE. The authentication is performed as described in TS 33.501 [15]. The AUSF selects a UDM as described in TS 23.501 [2], clause 6.3.8 and gets the authentication data from UDM.

Once the UE has been authenticated the AUSF provides relevant security related information to the AMF. If the AMF provided a SUCI to AUSF, the AUSF shall return the SUPI to AMF only after the authentication is successful.

After successful authentication in new AMF, which is triggered by the integrity check failure in old AMF at step 5, the new AMF invokes step 4 above again and indicates that the UE is validated (i.e. through the reason parameter as specified in clause 5.2.2.2.2).

Step 9b. If NAS security context does not exist, the NAS security initiation is performed as described in TS 33.501 [15]. If the UE had no NAS security context in step 1, the UE includes the full Registration Request message as defined in TS 24.501 [25].

The AMF decides if the Registration Request needs to be rerouted as described in clause 4.2.2.2.3, where the initial AMF refers to the AMF.

Step 9c. The AMF initiates NGAP procedure to provide the 5G-AN with security context as specified in TS 38.413 if the 5G-AN had requested for UE Context. Also, if the AMF decides that EPS fallback is supported (e.g. based on UE capability to support Request Type flag "handover" for PDN connectivity request during the attach procedure as defined in clause 5.17.2.3.1 of TS 23.501 [2], subscription data and local policy), the AMF shall send an indication "Redirection for EPS fallback for voice is possible" towards 5G-AN as specified in TS 38.413 [10]. Otherwise, the AMF indicates "Redirection for EPS fallback for voice is not possible". In addition, if Tracing Requirements about the UE are available at the AMF, the AMF provides the 5G-AN with Tracing Requirements in the NGAP procedure.

Step 9d. The 5G-AN stores the security context and acknowledges to the AMF. The 5G-AN uses the security context to protect the messages exchanged with the UE as described in TS 33.501 [15].

Step 10. [Conditional] new AMF to old AMF: Namf_Communication_RegistrationStatusUpdate (PDU Session ID(s) to be released due to slice not supported).

If the AMF has changed the new AMF informs the old AMF that the registration of the UE in the new AMF is completed by invoking the Namf_Communication_RegistrationStatusUpdate service operation.

If the authentication/security procedure fails, then the Registration shall be rejected, and the new AMF invokes the Namf_Communication_RegistrationStatusUpdate service operation with a reject indication towards the old AMF. The old AMF continues as if the UE context transfer service operation was never received.

If one or more of the S-NSSAIs used in the old Registration Area cannot be served in the target Registration Area, the new AMF determines which PDU Session cannot be supported in the new Registration Area. The new AMF invokes the Namf_Communication_RegistrationStatusUpdate service operation including the rejected PDU Session ID towards the old AMF. Then the new AMF modifies the PDU Session Status correspondingly. The old AMF informs the corresponding SMF(s) to locally release the UE's SM context by invoking the Nsmf_PDUSession_ReleaseSMContext service operation.

If new AMF received in the UE context transfer in step 2 the information about the AM Policy Association and the UE Policy Association and decides, based on local policies, not to use the PCF(s) identified by the PCF ID(s) for the AM Policy Association and the UE Policy Association, then it will inform the old AMF that the AM Policy Association and the UE Policy Association in the UE context is not used any longer and then the PCF selection is performed in step 15.

Step 11. [Conditional] New AMF to UE: Identity Request/Response (PEI).

If the PEI was not provided by the UE nor retrieved from the old AMF the Identity Request procedure is initiated by AMF sending an Identity Request message to the UE to retrieve the PEI. The PEI shall be transferred encrypted unless the UE performs Emergency Registration and cannot be authenticated.

For an Emergency Registration, the UE may have included the PEI in the Registration Request. If so, the PEI retrieval is skipped.

If the UE supports RACS as indicated in UE MM Core Network Capability, the AMF shall use the PEI of the UE to obtain the IMEI/TAC for the purpose of RACS operation.

Step 12. Optionally the new AMF initiates ME identity check by invoking the N5g-eir_EquipmentIdentityCheck_Get service operation (see clause 5.2.4.2.2).

The PEI check is performed as described in clause 4.7.

For an Emergency Registration, if the PEI is blocked, operator policies determine whether the Emergency Registration procedure continues or is stopped.

Step 13. If step 14 is to be performed, the new AMF, based on the SUPI, selects a UDM, then UDM may select a UDR instance. See TS 23.501 [2], clause 6.3.9.

The AMF selects a UDM as described in TS 23.501 [2], clause 6.3.8.

Step 14a-c. If the AMF has changed since the last Registration procedure, or if the UE provides a SUPI which doesn't refer to a valid context in the AMF, or if the UE registers to the same AMF it has already registered to a non-3GPP access (i.e. the UE is registered over a non-3GPP access and initiates this Registration procedure to add a 3GPP access), the new AMF registers with the UDM using Nudm_UECM_Registration for the access to be registered (and subscribes to be notified when the UDM deregisters this AMF).

The AMF provides the "Homogenous Support of IMS Voice over PS Sessions" indication (see clause 5.16.3.3 of TS 23.501 [2]) to the UDM. The "Homogenous Support of IMS Voice over PS Sessions" indication shall not be included unless the AMF has completed its evaluation of the support of "IMS Voice over PS Session" as specified in clause 5.16.3.2 of TS 23.501 [2].

During initial Registration, if the AMF and UE supports SRVCC from NG-RAN to UTRAN the AMF provides UDM with the UE SRVCC capability.

If the AMF determines that only the UE SRVCC capability has changed, the AMF sends UE SRVCC capability to the UDM.

NOTE 8: At this step, it is possible that the AMF does not have all the information needed to determine the setting of the IMS Voice over PS Session Supported indication for this UE (see clause 5.16.3.2 of TS 23.501 [2]). Hence the AMF can send the "Homogenous Support of IMS Voice over PS Sessions" later on in this procedure.

If the AMF does not have subscription data for the UE, the AMF retrieves the Access and Mobility Subscription data, SMF Selection Subscription data, UE context in SMF data and LCS mobile origination using Nudm_SDM_Get. If the AMF already has subscription data for the UE but the SoR Update Indicator in the UE context requires the AMF to retrieve SoR information depending on the NAS Registration Type ("Initial Registration" or "Emergency Registration") (see Annex C of TS 23.122 [22]), the AMF retrieves the Steering of Roaming information using Nudm_SDM_Get. This requires that UDM may retrieve this information from UDR by Nudr_DM_Query. After a successful response is received, the AMF subscribes to be notified using Nudm_SDM_Subscribe when the data requested is modified, UDM may subscribe to UDR by Nudr_DM_Subscribe. The GPSI is provided to the AMF in the Access and Mobility Subscription data from the UDM if the GPSI is available in the UE subscription data. The UDM may provide indication that the subscription data for network slicing is updated for the UE. If the UE is subscribed to MPS in the serving PLMN, "MPS priority" is included in the Access and Mobility Subscription data provided to the AMF. If the UE is subscribed to MCX in the serving PLMN, "MCX priority" is included in the Access and Mobility Subscription data provided to the AMF. The UDM also provides the IAB-Operation allowed indication to AMF as part of the Access and Mobility Subscription data. The AMF shall trigger the setup of the UE context in NG-RAN, or modification of the UE context in NG-RAN if the initial setup is at step 9c, including an indication that the IAB-node is authorized.

The new AMF provides the Access Type it serves for the UE to the UDM and the Access Type is set to "3GPP access". The UDM stores the associated Access Type together with the serving AMF and does not remove the AMF identity associated to the other Access Type if any. The UDM may store in UDR information provided at the AMF registration by Nudr_DM_Update.

If the UE was registered in the old AMF for an access, and the old and the new AMFs are in the same PLMN, the new AMF sends a separate/independent Nudm_UECM_Registration to update UDM with Access Type set to access used in the old AMF, after the old AMF relocation is successfully completed.

The new AMF creates a UE context for the UE after getting the Access and Mobility Subscription data from the UDM. The Access and Mobility Subscription data includes whether the UE is allowed to include NSSAI in the 3GPP access RRC Connection Establishment in clear text. The Access and Mobility Subscription data may include Enhanced Coverage Restricted information. If received from the UDM and the UE included support for restriction of use of Enhanced Coverage in step 1, the AMF determines whether Enhanced Coverage is restricted or not for the UE as specified in TS 23.501 [2] clause 5.31.12 and stores the updated Enhanced Coverage Restricted information in the UE context.

The Access and Mobility Subscription data may include the NB-IoT UE priority.

The subscription data may contain Service Gap Time parameter. If received from the UDM, the AMF stores this Service Gap Time in the UE Context in AMF for the UE.

For an Emergency Registration in which the UE was not successfully authenticated, the AMF shall not register with the UDM.

The AMF enforces the Mobility Restrictions as specified in TS 23.501 [2] clause 5.3.4.1.1. For an Emergency Registration, the AMF shall not check for Mobility Restrictions, access restrictions, regional restrictions or subscription restrictions. For an Emergency Registration, the AMF shall ignore any unsuccessful registration response from UDM and continue with the Registration procedure.

NOTE 9: The AMF can, instead of the Nudm_SDM_Get service operation, use the Nudm_SDM_Subscribe service operation with an Immediate Report Indication that triggers the UDM to immediately return the subscribed data if the corresponding feature is supported by both the AMF and the UDM.

Step 14d. When the UDM stores the associated Access Type (e.g. 3GPP) together with the serving AMF as indicated in step 14a, it will cause the UDM to initiate a Nudm_UECM_DeregistrationNotification (see clause 5.2.3.2.2) to the old AMF corresponding to the same (e.g. 3GPP) access, if one exists. If the timer started in step 5 is not running, the old AMF may remove the UE context for the same Access Type. Otherwise, the AMF may remove UE context for the same Access Type when the timer expires. If the serving NF removal reason indicated by the UDM is Initial Registration, then, as described in clause 4.2.2.3.2, the old AMF invokes the NsmfPDUSession_ReleaseSMContext (SM Context ID) service operation towards all the associated SMF(s) of the UE to notify that the UE is deregistered from old AMF for the same Access Type. The SMF(s) shall release the PDU Session on getting this notification.

If the old AMF has established an AM Policy Association and a UE Policy Association with the PCF(s), and the old AMF did not transfer the PCF ID(s) to the new AMF (e.g. new AMF is in different PLMN), the old AMF performs an AMF-initiated Policy Association Termination procedure, as defined in clause 4.16.3.2, and performs an AMF-initiated UE Policy Association Termination procedure, as defined in clause 4.16.13.1. In addition, if the old AMF transferred the PCF ID(s) in the UE context but the new AMF informed in step 10 that the AM Policy Association information and UE Policy Association information in the UE context will not be used then the old AMF performs an AMF-initiated Policy Association Termination procedure, as defined in clause 4.16.3.2, and performs an AMF-initiated UE Policy Association Termination procedure, as defined in clause 4.16.13.1.

If the old AMF has an N2 connection for that UE (e.g. because the UE was in RRC Inactive state but has now moved to E-UTRAN or moved to an area not served by the old AMF), the old AMF shall perform AN Release (see clause 4.2.6) with a cause value that indicates that the UE has already locally released the NG-RAN's RRC Connection.

Step 14e. [Conditional] If old AMF does not have UE context for another access type (i.e. non-3GPP access), the Old AMF unsubscribes with the UDM for subscription data using Nudm_SDM_unsubscribe.

Step 15. If the AMF decides to initiate PCF communication, the AMF acts as follows.

If the new AMF decides to use the (V-)PCF identified by the (V-)PCF ID included in UE context from the old AMF in step 5, the AMF contacts the (V-) PCF identified by the (V-)PCF ID to obtain policy. If the AMF decides to perform PCF discovery and selection and the AMF selects a (V)-PCF and may select an H-PCF (for roaming scenario) as described in TS 23.501 [2], clause 6.3.7.1 and according to the V-NRF to H-NRF interaction described in clause 4.3.2.2.3.3.

Step 16. [Optional] new AMF performs an AM Policy Association Establishment/Modification. For an Emergency Registration, this step is skipped.

If the new AMF selects a new (V-)PCF in step 15, the new AMF performs AM Policy Association Establishment with the selected (V-)PCF as defined in clause 4.16.1.2.

If the (V-)PCF identified by the (V-)PCF ID included in UE context from the old AMF is used, the new AMF performs AM Policy Association Modification with the (V-)PCF as defined in clause 4.16.2.1.2.

If the AMF notifies the Mobility Restrictions (e.g. UE location) to the PCF for adjustment, or if the PCF updates the Mobility Restrictions itself due to some conditions (e.g. application in use, time and date), the PCF shall provide the updated Mobility Restrictions to the AMF. If the subscription information includes Tracing Requirements, the AMF provides the PCF with Tracing Requirements.

If the AMF supports DNN replacement, the AMF provides the PCF with the Allowed NSSAI and, if available, the Mapping Of Allowed NSSAI.

If the PCF supports DNN replacement, the PCF provides the AMF with triggers for DNN replacement.

Step 17. [Conditional] AMF to SMF: Nsmf_PDUSession_UpdateSMContext ( ).

For an Emergency Registered UE (see TS 23.501 [2]), this step is applied when the Registration Type is Mobility Registration Update.

The AMF invokes the NsmfPDUSession_UpdateSMContext (see clause 5.2.8.2.6) in the following scenario(s):

If the List Of PDU Sessions To Be Activated is included in the Registration Request in step 1, the AMF sends Nsmf_PDUSession_UpdateSMContext Request to SMF(s) associated with the PDU Session(s) in order to activate User Plane connections of these PDU Session(s). Steps from step 5 onwards described in clause 4.2.3.2 are executed to complete the User Plane connection activation without sending the RRC Inactive Assistance Information and without sending MM NAS Service Accept from the AMF to (R)AN described in step 12 of clause 4.2.3.2. When a User Plane connection for a PDU Session is activated, the AS layer in the UE indicates it to the NAS layer.

If the AMF has determined in step 3 that the UE is performing Inter-RAT mobility to or from NB-IoT, the AMF sends Nsmf_PDUSession_UpdateSMContext Request to SMF(s) associated with the UEs PDU Session(s), so the SMF(s) can update them according to the "PDU Session continuity at inter RAT mobility" subscription data. Steps from step 5 onwards described in clause 4.2.3.2 are executed without sending MM NAS Service Accept from the AMF to (R)AN described in step 12 of clause 4.2.3.2.

When the serving AMF has changed, the new serving AMF notifies the SMF for each PDU Session that it has taken over the responsibility of the signalling path towards the UE: the new serving AMF invokes the Nsmf_PDUSession_UpdateSMContext service operation using SMF information received from the old AMF at step 5. It also indicates whether the PDU Session is to be re-activated.

NOTE 10: If the UE moves into a different PLMN, the AMF in the serving PLMN can insert or change the V-SMF(s) in the serving PLMN for Home Routed PDU session(s). In this case, the same procedures described in clause 4.23.3 are applied for the V-SMF change as for the I-SMF change (i.e. by replacing the I-SMF with V-SMF). During inter-PLMN change, if the same SMF is used, session continuity can be supported depending on operator policies.

Steps from step 5 onwards described in clause 4.2.3.2 are executed. In the case that the intermediate UPF insertion, removal, or change is performed for the PDU Session(s) not included in "PDU Session(s) to be re-activated", the procedure is performed without N11 and N2 interactions to update the N3 user plane between (R)AN and 5GC.

The AMF invokes the NsmfPDUSession_ReleaseSM-Context service operation towards the SMF in the following scenario:

If any PDU Session status indicates that it is released at the UE, the AMF invokes the NsmfPDUSession_ReleaseSMContext service operation towards the SMF in order to release any network resources related to the PDU Session.

If the serving AMF is changed, the new AMF shall wait until step 18 is finished with all the SMFs associated with the UE. Otherwise, steps 19 to 22 can continue in parallel to this step.

Step 18. [Conditional] If the new AMF and the old AMF are in the same PLMN, the new AMF sends a UE Context Modification Request to N3IWF/TNGF/W-AGF as specified in TS 29.413 [64].

If the AMF has changed and the old AMF has indicated that the UE is in CM-CONNECTED state via N3IWF, W-AGF or TNGF and if the new AMF and the old AMF are in the same PLMN, the new AMF creates an NGAP UE association towards the N3IWF/TNGF/W-AGF to which the UE is connected. This automatically releases the existing NGAP UE association between the old AMF and the N3IWF/TNGF/W-AGF.

Step 19. N3IWF/TNGF/W-AGF sends a UE Context Modification Response to the new AMF.

Step 19a. [Conditional] After the new AMF receives the response message from the N3IWF, W-AGF or TNGF in step 19, the new AMF registers with the UDM using Nudm_UECM_Registration as step 14a, but with the Access Type set to "non-3GPP access". The UDM stores the associated Access Type together with the serving AMF and does not remove the AMF identity associated to the other Access Type if any. The UDM may store in UDR information provided at the AMF registration by Nudr_DM_Update.

Step 19b. [Conditional] When the UDM stores the associated Access Type (i.e. non-3GPP) together with the serving AMF as indicated in step 19a, it will cause the UDM to initiate a Nudm_UECM_DeregistrationNotification (see clause 5.2.3.2.2) to the old AMF corresponding to the same (i.e. non-3GPP) access. The old AMF removes the UE context for non-3GPP access.

Step 19c. The Old AMF unsubscribes with the UDM for subscription data using Nudm_SDM_unsubscribe.

Step 20a. Void.

Step 21. New AMF to UE: Registration Accept (5G-GUTI, Registration Area, [Mobility restrictions], [PDU Session status], [Allowed NSSAI], [Mapping Of Allowed NSSAI], [Configured NSSAI for the Serving PLMN], [Mapping Of Configured NSSAI], [rejected S-NSSAIs], [Pending NSSAI], [Mapping Of Pending NSSAI], [Periodic Registration Update timer], [Active Time], [Strictly Periodic Registration Timer Indication], [LADN Information], [accepted MICO mode], [IMS Voice over PS session supported Indication], [Emergency Service Support indicator], [Accepted DRX parameters for E-UTRA and NR], [Accepted DRX parameters for NB-IoT], [extended idle mode DRX parameters], [Paging Time Window], [Network support of Interworking without N26], [Access Stratum Connection Establishment NSSAI Inclusion Mode], [Network Slicing Subscription Change Indication], [Operator-defined access category definitions], [List of equivalent PLMNs], [Enhanced Coverage Restricted information], [Supported Network Behaviour], [Service Gap Time], [PLMN-assigned UE Radio Capability ID], [PLMN-assigned UE Radio Capability ID deletion], [WUS Assistance Information], [Truncated 5G-S-TMSI Configuration]).

If the Requested NSSAI does not include S-NSSAIs which map to S-NSSAIs of the HPLMN subject to Network Slice-Specific Authentication and Authorization and the AMF determines that no S-NSSAI can be provided in the Allowed NSSAI for the UE in the current UE's Tracking Area and if no default S-NSSAI(s) not yet involved in the current UE Registration procedure could be further considered, the AMF shall reject the UE Registration and shall include in the rejection message the list of Rejected S-NS-SAIs, each of them with the appropriate rejection cause value.

The Allowed NSSAI for the Access Type for the UE is included in the N2 message carrying the Registration Accept message. The Allowed NSSAI contains only S-NSSAIs that do not require, based on subscription information, Network Slice-Specific Authentication and Authorization and, based on the UE Context in the AMF, those S-NSSAIs for which Network Slice-Specific Authentication and Authorization previously succeeded, regardless of the Access Type. The Mapping Of Pending NSSAI is the mapping of each S-NS-SAI of the Pending NSSAI for the Serving PLMN to the HPLMN S-NSSAIs.

If the UE has indicated its support for Network Slice-Specific Authentication and Authorization procedure in the UE MM Core Network Capability in the Registration Request, AMF includes in the Pending NSSAI the S-NS-SAIs that map to an S-NSSAI of the HPLMN which in the subscription information has indication that it is subject to Network Slice-Specific Authentication and Authorization, as described in clause 4.6.2.4 of TS 24.501 [25]. In such case, the AMF then shall trigger at step 25 the Network Slice-Specific Authentication and Authorization procedure, specified in clause 4.2.9.2, except, based on Network policies, for those S-NSSAIs for which Network Slice-Specific Authentication and Authorization have already been initiated on another Access Type for the same S-NSSAI(s). The UE shall not attempt re-registration with the S-NSSAIs included in the list of Pending NSSAIs until the Network Slice-Specific Authentication and Authorization procedure has been completed, regardless of the Access Type.

If the UE has not indicated its support for Network Slice-Specific Authentication and Authorization procedure in the UE 5GMM Core Network Capability in the Registration Request, and the Requested NSSAI includes S-NS-SAIs which map to HPLMN S-NSSAIs subject to Network Slice-Specific Authentication and Authorization, the AMF includes those S-NSSAIs in the Requested NSSAI in the Rejected S-NSSAIs.

If No S-NSSAI can be Provided in the Allowed NSSAI Because:
   all the S-NSSAI(s) in the Requested NSSAI are to be subject to Network Slice-Specific Authentication and Authorization; or
   no Requested NSSAI was provided or none of the S-NS-SAIs in the Requested NSSAI matches any of the Subscribed S-NSSAIs, and all the S-NSSAI(s) marked as default in the Subscribed S-NSSAIs are to be subject to Network Slice-Specific Authentication and Authorization.

The AMF shall provide an empty Allowed NSSAI. Upon receiving an empty Allowed NSSAI and a Pending NSSAI, the UE is registered in the PLMN but shall wait for the completion of the Network Slice-Specific Authentication and Authorization procedure without attempting to use any service provided by the PLMN on any access, except e.g. emergency services (see TS 24.501 [25]), until the UE receives an Allowed NSSAI.

The AMF stores the NB-IoT Priority retrieved in Step 14 and associates it to the 5G-S-TMSI allocated to the UE.

The AMF sends a Registration Accept message to the UE indicating that the Registration Request has been accepted. 5G-GUTI is included if the AMF allocates a new 5G-GUTI. Upon receiving a Registration Request message of type "Initial Registration" or "mobility registration update" from the UE, the AMF shall include a new 5G-GUTI in the Registration Accept message. Upon receiving a Registration Request message of type "periodic registration update" from the UE, the AMF should include a new 5G-GUTI in the Registration Accept message. If the UE is already in RM-REGISTERED state via another access in the same PLMN, the UE shall use the 5G-GUTI received in the Registration Accept for both registrations. If no 5G-GUTI is included in the Registration Accept, then the UE uses the 5G-GUTI assigned for the existing registration also for the new registration. If the AMF allocates a new Registration area, it shall send the Registration area to the UE via Registration Accept message. If there is no Registration area included in the Registration Accept message, the UE shall consider the old Registration Area as valid. Mobility Restrictions is included if mobility restrictions apply for the UE and Registration Type is not Emergency Registration. The AMF indicates the established PDU Sessions to the UE in the PDU Session status. The UE removes locally any internal resources related to PDU Sessions that are not marked as established in the received PDU Session status. If the AMF invokes the Nsmf_PDUSession_UpdateSMContext procedure for UP activation of PDU Session(s) in step 18 and receives rejection from the SMF, then the AMF indicates to the UE the PDU Session ID and the cause why the User Plane resources were not activated. When the UE is connected to the two AMFs belonging to different PLMN via 3GPP access and non-3GPP access then the UE removes locally any internal resources related to the PDU Session of the current PLMN that are not marked as established in received PDU Session status. If the PDU Session status information was in the Registration Request, the AMF shall indicate the PDU Session status to the UE.

If the RAT Type is NB-IoT and the network is configured to use the Control Plane Relocation Indication procedure then the AMF shall include in the Registration Accept message the Truncated 5G-S-TMSI Configuration that the UE using Control Plane CIoT 5GS Optimisation uses to create the Truncated 5G-S-TMSI, see TS 23.501 [2] clause 5.31.4.3.

The Allowed NSSAI provided in the Registration Accept is valid in the Registration Area and it applies for all the PLMNs which have their Tracking Areas included in the Registration Area. The Mapping Of Allowed NSSAI is the mapping of each S-NSSAI of the Allowed NSSAI to the HPLMN S-NSSAIs. The Mapping Of Configured NSSAI is the mapping of each S-NSSAI of the Configured NSSAI for the Serving PLMN to the HPLMN S-NSSAIs.

The AMF shall include in the Registration Accept message the LADN Information for the list of LADNs, described in TS 23.501 [2] clause 5.6.5, that are available within the Registration area determined by the AMF for the UE. The AMF may include Operator-defined access category definitions to let the UE determine the applicable Operator-specific access category definitions as described in TS 24.501 [25].

If the UE included MICO mode in the Registration Request, then AMF responds in the Registration Accept message whether MICO mode should be used. When MICO mode is allowed for the UE, the AMF may include an Active Time value and/or Strictly Periodic Registration Timer Indication in the Registration Accept message. The AMF determines the Periodic Registration Update timer value, Active Time value and the Strictly Periodic Registration Timer Indication based on local configuration, Expected UE Behaviour if available, UE indicated preferences, UE capability, UE subscription information and network policies, or any combination of them so as to enable UE power saving, as described in TS 23.501 [2], clause 5.31.7. The AMF determines to apply the Strictly Periodic Registration Timer Indication to the UE if the UE indicates its capability of the Strictly Periodic Registration Timer Indication in the registration request message, as described in step 1. If the AMF provides the Periodic Registration Update timer value with the Strictly Periodic Registration Timer Indication to the UE, the UE and the AMF start the Periodic Registration Update timer after this step, as described in TS 23.501 [2], clause 5.31.7.5.

In the case of registration over 3GPP access, the AMF Sets the IMS Voice over PS session supported Indication as described in clause 5.16.3.2 of TS 23.501 [2]. In order to set the IMS Voice over PS session supported Indication the AMF may need to perform the UE Capability Match Request procedure in clause 4.2.8a to check the compatibility of the UE and NG-RAN radio capabilities related to IMS Voice over PS. If the AMF hasn't received Voice Support Match Indicator from the NG-RAN on time then, based on implementation, AMF may set IMS Voice over PS session supported Indication and update it at a later stage.

In the case of registration over non-3GPP access, the AMF Sets the IMS Voice over PS session supported Indication as described in clause 5.16.3.2a of TS 23.501 [2].

The Emergency Service Support indicator informs the UE that emergency services are supported, i.e. the UE is allowed to request PDU Session for emergency services. If the AMF received "MPS priority" from the UDM as part of Access and Mobility Subscription data, based on operator policy, "MPS priority" is included in the Registration Accept message to the UE to inform the UE whether configuration of Access Identity 1 is valid within the selected PLMN, as specified in TS 24.501 [25]. If the AMF received "MCX priority" from the UDM as part of Access and Mobility Subscription data, based on operator policy and UE subscription to MCX Services, "MCX priority" is included in the Registration Accept message to the UE to inform the UE whether configuration of Access Identity 2 is valid within the selected PLMN, as specified in TS 24.501 [25]. The Accepted DRX parameters are defined in clause 5.4.5 of TS 23.501 [2]. The AMF includes Accepted DRX parameters for NB-IoT, if the UE included Requested DRX parameters for NB-IoT in the Registration Request message. The AMF Sets the Network support of Interworking without N26 parameter as described in clause 5.17.2.3.1 of TS 23.501 [2]. If the AMF accepts the use of extended idle mode DRX, the AMF includes the extended idle mode DRX parameters and Paging Time Window as described in 5.31.7.2 of TS 23.501 [2].

If the UDM intends to indicate the UE that subscription has changed, the Network Slicing Subscription Change Indication is included. If the AMF includes Network Slicing Subscription Change Indication, then the UE shall locally erase all the network slicing configuration for all PLMNs and, if applicable, update the configuration for the current PLMN based on any received information.

The Access Stratum Connection Establishment NSSAI Inclusion Mode, as specified in TS 23.501 [2] clause 5.15.9, is included to instruct the UE on what NSSAI, if any, to include in the Access Stratum connection establishment. The AMF can set the value to modes of operation a,b,c defined in TS 23.501 [2] clause 5.15.9 in the 3GPP Access only if the Inclusion of NSSAI in RRC Connection Establishment Allowed indicates that it is allowed to do so.

For a UE registered in a PLMN, the AMF may provide a List of equivalent PLMNs which is handled as specified in TS 24.501 [25]. For a UE registered in an SNPN, the AMF shall not provide a list of equivalent PLMNs to the UE.

If the UE included support for restriction of use of Enhanced Coverage in step 1, the AMF sends the Enhanced Coverage Restricted information to the NG-RAN in N2 message. The AMF also sends Enhanced Coverage Restricted information to the UE in the Registration Accept message.

If the UE receives Enhanced Coverage Restricted information in the Registration Accept message, the UE shall store this information and shall use the value of Enhanced Coverage Restricted information to determine if Enhanced Coverage feature should be used or not.

If the UE and the AMF have negotiated to enable MICO mode and the AMF uses the Extended connected timer, then the AMF provides the Extended Connected time value to NG-RAN (see clause 5.31.7.3 of TS 23.501 [2]) in this step. The Extended Connected Time value indicates the minimum time the RAN should keep the UE in RRC-CONNECTED state regardless of inactivity.

The AMF indicates the CIoT 5GS Optimisations it supports and accepts in the Supported Network Behaviour information (see TS 23.501 [2], clause 5.31.2) if the UE included Preferred Network Behaviour in its Registration Request.

The AMF may steer the UE from 5GC by rejecting the Registration Request. The AMF should take into account the Preferred and Supported Network Behaviour (see TS 23.501 [2], clause 5.31.2) and availability of EPC to the UE before steering the UE from 5GC.

If the AMF accepts MICO mode and knows there may be mobile terminated data or signalling pending, the AMF maintains the N2 connection for at least the Extended Connected Time as described in clause 5.31.7.3 of TS 23.501 [2], and provides the Extended Connected Time value to the RAN.

The AMF includes Service Gap Time if Service Gap Time is present in the subscription information (steps 14a-c) or the Service Gap Time has been updated by the Subscriber Data Update Notification to AMF procedure (see clause 4.5.1) and the UE has indicated UE Service Gap Control Capability.

If the UE receives a Service Gap Time in the Registration Accept message, the UE shall store this parameter and apply Service Gap Control (see TS 23.501 [2] clause 5.31.16).

If the network supports WUS grouping (see TS 23.501 [2]), the AMF shall send the WUS Assistance Information to the UE. If the UE provided the UE paging probability information in Step 1, the AMF takes it into account to determine the WUS Assistance Information.

When the UE and the AMF supports RACS as defined in TS 23.501 [2] clause 5.4.4.1a, and the AMF needs to configure the UE with a UE Radio Capability ID, and the AMF already has the UE radio capabilities other than NB-IoT radio capabilities for the UE, the AMF may provide the UE with the UE Radio Capability ID for the UE radio capabilities the UCMF returns to the AMF in a Nucmf_assign service operation for this UE. Alternatively, when the UE and the AMF support RACS, the AMF may provide the UE with an indication to delete any PLMN-assigned UE Radio Capability ID in this PLMN (see TS 23.501 [2] clause 5.4.4.1a).

If the UE is "CAG supported", and the AMF needs to update the CAG information of the UE, the AMF may include the CAG information as part of the Mobility Restrictions in the Registration Accept message.

Step 21b. [Optional] The new AMF performs a UE Policy Association Establishment as defined in clause 4.16.11. For an Emergency Registration, this step is skipped.

The new AMF sends a Npcf_UEPolicyControl Create Request to PCF. PCF sends a Npcf_UEPolicyControl Create Response to the new AMF.

PCF triggers UE Configuration Update Procedure as defined in clause 4.2.4.3.

Step 22. [Conditional] UE to new AMF: Registration Complete ( ).

The UE sends a Registration Complete message to the AMF when it has successfully updated itself after receiving any of the [Configured NSSAI for the Serving PLMN], [Mapping Of Configured NSSAI] and a Network Slicing Subscription Change Indication, or CAG information in step 21.

The UE sends a Registration Complete message to the AMF to acknowledge if a new 5G-GUTI was assigned.

If new 5G-GUTI was assigned, then the UE passes the new 5G-GUTI to its 3GPP access' lower layer when a lower layer (either 3GPP access or non-3GPP access) indicates to the UE's RM layer that the Registration Complete message has been successfully transferred across the radio interface.

NOTE 11: The above is needed because the NG-RAN may use the RRC Inactive state and a part of the 5G-GUTI is used to calculate the Paging Frame (see TS 38.304 and TS 36.304 [43]). It is assumed that the Registration Complete is reliably delivered to the AMF after the 5G-AN has acknowledged its receipt to the UE.

When the List Of PDU Sessions To Be Activated is not included in the Registration Request and the Registration procedure was not initiated in CM-CONNECTED state, the AMF releases the signalling connection with UE, according to clause 4.2.6.

When the Follow-on request is included in the Registration Request, the AMF should not release the signalling connection after the completion of the Registration procedure.

If the AMF is aware that some signalling is pending in the AMF or between the UE and the 5GC, the AMF should not release the signalling connection immediately after the completion of the Registration procedure.

If PLMN-assigned UE Radio Capability ID is included in step 21, the AMF stores the PLMN-assigned UE Radio Capability ID in UE context if receiving Registration Complete message.

If the UE receives PLMN-assigned UE Radio Capability ID deletion indication in step 21, the UE shall delete the PLMN-assigned UE Radio Capability ID(s) for this PLMN.

Step 23. [Conditional] AMF to UDM: If the Access and Mobility Subscription data provided by UDM to AMF in 14b includes Steering of Roaming information with an indication that the UDM requests an acknowledgement of the reception of this information from the UE, the AMF provides the UE acknowledgement to UDM using Nudm_SDM_Info. For more details regarding the handling of Steering of Roaming information refer to TS 23.122 [22].

Step 23a. For Registration over 3GPP Access, if the AMF does not release the signalling connection, the AMF sends the RRC Inactive Assistance Information to the NG-RAN.

For Registration over non-3GPP Access, if the UE is also in CM-CONNECTED state on 3GPP access, the AMF sends the RRC Inactive Assistance Information to the NG-RAN.

The AMF also uses the Nudm_SDM_Info service operation to provide an acknowledgment to UDM that the UE received CAG information, or the Network Slicing Subscription Change Indication (see step 21 and step 22) and acted upon it.

Step 24. [Conditional] AMF to UDM: After step 14a, and in parallel to any of the preceding steps, the AMF shall send a "Homogeneous Support of IMS Voice over PS Sessions" indication to the UDM using Nudm_UECM_Update:

If the AMF has evaluated the support of IMS Voice over PS Sessions, see clause 5.16.3.2 of TS 23.501 [2], and If the AMF determines that it needs to update the Homogeneous Support of IMS Voice over PS Sessions, see clause 5.16.3.3 of TS 23.501 [2].

Step 25. [Conditional] If the UE indicates its support for Network Slice-Specific Authentication and Authorization procedure in the UE MM Core Network Capability in Registration Request, and any S-NSSAI of the HPLMN is subject to Network Slice-Specific Authentication and Authorization, the related procedure is executed at this step (see clause 4.2.9.1). Once the Network Slice-Specific Authentication and Authorization procedure is completed for all S-NSSAIs, the AMF shall trigger a UE Configuration Update procedure to deliver an Allowed NSSAI containing also the S-NSSAIs for which the Network Slice-Specific Authentication and Authorization was successful, and include any rejected NSSAIs with an appropriate rejection cause value.

The AMF shall remove the mobility restriction if the Tracking Areas of the Registration Area were previously assigned as a Non-Allowed Area due to pending Network Slice-Specific Authentication and Authorization.

The AMF stores an indication in the UE context for any S-NSSAI of the HPLMN subject to Network Slice-Specific Authentication and Authorization for which the Network Slice-Specific Authentication and Authorization succeeds.

Once completed the Network Slice-Specific Authentication and Authorization procedure, if the AMF determines that no S-NSSAI can be provided in the Allowed NSSAI for the UE, which is already authenticated and authorized successfully by a PLMN, and if no default S-NSSAI(s) could be further considered, the AMF shall execute the Network-initiated Deregistration procedure described in clause 4.2.2.3.3, and shall include in the explicit De-Registration Request message the list of Rejected S-NSSAIs, each of them with the appropriate rejection cause value.

The mobility related event notifications towards the NF consumers are triggered at the end of this procedure for cases as described in clause 4.15.4.

LIST OF ABBREVIATIONS

For the purposes of the present document, the abbreviations given in 3GPP TR 21.905 [1] and the following apply. An abbreviation defined in the present document takes precedence over the definition of the same abbreviation, if any, in 3GPP TR 21.905 [1].

[Definitions]

| | |
|---|---|
| 4G-GUTI | 4G Globally Unique Temporary UE Identity |
| 5GC | 5G Core Network |
| 5GLAN | 5G Local Area Network |
| 5GS | 5G System |
| 5G-AN | 5G Access Network |
| 5G-AN PDB | 5G Access Network Packet Delay Budget |
| 5G-EIR | 5G-Equipment Identity Register |
| 5G-GUTI | 5G Globally Unique Temporary Identifier |
| 5G-BRG | 5G Broadband Residential Gateway |
| 5G-CRG | 5G Cable Residential Gateway |
| 5G GM | 5G Grand Master |
| 5G-RG | 5G Residential Gateway |
| 5G-S-TMSI | 5G S-Temporary Mobile Subscription Identifier |
| 5G VN 5G | Virtual Network |
| 5QI | 5G QOS Identifier |
| AF | Application Function |
| AMF | Access and Mobility Management Function |
| AS | Access Stratum |
| ATSSS | Access Traffic Steering, Switching, Splitting |
| ATSSS-LL | ATSSS Low-Layer |
| AUSF | Authentication Server Function |
| AUTN | Authentication token |
| BMCA | Best Master Clock Algorithm |
| BSF | Binding Support Function |
| CAG | Closed Access Group |
| CAPIF | Common API Framework for 3GPP northbound APIs |
| CHF | Charging Function |
| CN | PDB Core Network Packet Delay Budget |
| CP | Control Plane |
| DAPS | Dual Active Protocol Stacks |
| DL | Downlink |
| DN | Data Network |
| DNAI | DN Access Identifier |
| DNN | Data Network Name |
| DRX | Discontinuous Reception |
| DS-TT | Device-side TSN translator |
| ePDG | evolved Packet Data Gateway |
| EBI | EPS Bearer Identity |
| EPS | Evolved Packet System |
| EUI | Extended Unique Identifier |
| FAR | Forwarding Action Rule |
| FN-BRG | Fixed Network Broadband RG |
| FN-CRG | Fixed Network Cable RG |
| FN-RG | Fixed Network RG |
| FQDN | Fully Qualified Domain Name |
| GFBR | Guaranteed Flow Bit Rate |
| GMLC | Gateway Mobile Location Centre |
| GPSI | Generic Public Subscription Identifier |
| GUAMI | Globally Unique AMF Identifier |
| GUTI | Globally Unique Temporary UE Identity |
| HR | Home Routed (roaming) |
| IAB | Integrated access and backhaul |
| IMEI/TAC | IMEI Type Allocation Code |
| IPUPS | Inter PLMN UP Security |
| I-SMF | Intermediate SMF |
| I-UPF | Intermediate UPF |
| LADN | Local Area Data Network |
| LBO | Local Break Out (roaming) |
| LMF | Location Management Function |
| LoA | Level of Automation |
| LPP | LTE Positioning Protocol |
| LRF | Location Retrieval Function |
| MCC | Mobile country code |
| MCX | Mission Critical Service |
| MDBV | Maximum Data Burst Volume |
| MFBR | Maximum Flow Bit Rate |
| MICO | Mobile Initiated Connection Only |
| MITM | Man In the Middle |
| MNC | Mobile Network Code |
| MPS | Multimedia Priority Service |
| MPTCP | Multi-Path TCP Protocol |
| N3IWF | Non-3GPP InterWorking Function |
| N5CW | Non-5G-Capable over WLAN |
| NAI | Network Access Identifier |
| NAPT | Network Address Port Translation |
| NAT | Network Address Translation |
| NEF | Network Exposure Function |
| NF | Network Function |
| NGAP | Next Generation Application Protocol |

-continued

[Definitions]

| | |
|---|---|
| NID | Network identifier |
| NPN | Non-Public Network |
| NR | New Radio |
| NRF | Network Repository Function |
| NSI ID | Network Slice Instance Identifier |
| NSSAA | Network Slice-Specific Authentication and Authorization |
| NSSAAF | Network Slice-Specific Authentication and Authorization Function |
| NSSAI | Network Slice Selection Assistance Information |
| NSSF | Network Slice Selection Function |
| NSSP | Network Slice Selection Policy |
| NW-TT | Network-side TSN translator |
| NWDAF | Network Data Analytics Function |
| PCF | Policy Control Function |
| PDB | Packet Delay Budget |
| PDR | Packet Detection Rule |
| PDU | Protocol Data Unit |
| PEI | Permanent Equipment Identifier |
| PER | Packet Error Rate |
| PFD | Packet Flow Description |
| PNI-NPN | Public Network Integrated Non-Public Network |
| PPD | Paging Policy Differentiation |
| PPF | Paging Proceed Flag |
| PPI | Paging Policy Indicator |
| PSA | PDU Session Anchor |
| PTP | Precision Time Protocol |
| QFI | QoS Flow Identifier |
| QoE | Quality of Experience |
| RACS | Radio Capabilities Signalling optimization |
| (R)AN | (Radio) Access Network |
| RG | Residential Gateway |
| RIM | Remote Interference Management |
| RQA | Reflective QoS Attribute |
| RQI | Reflective QoS Indication |
| RSN | Redundancy Sequence Number |
| SA NR | Standalone New Radio |
| SBA | Service Based Architecture |
| SBI | Service Based Interface |
| SCP | Service Communication Proxy |
| SD | Slice Differentiator |
| SEAF | Security Anchor Functionality |
| SEPP | Security Edge Protection Proxy |
| SMF | Session Management Function |
| SMSF | Short Message Service Function |
| SN | Sequence Number |
| SN name | Serving Network Name. |
| SNPN | Stand-alone Non-Public Network |
| S-NSSAI | Single Network Slice Selection Assistance Information |
| SSC | Session and Service Continuity |
| SSCMSP | Session and Service Continuity Mode Selection Policy |
| SST | Slice/Service Type |
| SUCI | Subscription Concealed Identifier |
| SUPI | Subscription Permanent Identifier |
| SV | Software Version |
| TMSI | Temporary Mobile Subscriber Identity |
| TNAN | Trusted Non-3GPP Access Network |
| TNAP | Trusted Non-3GPP Access Point |
| TNGF | Trusted Non-3GPP Gateway Function |
| TNL | Transport Network Layer |
| TNLA | Transport Network Layer Association |
| TSC | Time Sensitive Communication |
| TSCAI | TSC Assistance Information |
| TSN | Time Sensitive Networking |
| TSN GM | TSN Grand Master |
| TSP | Traffic Steering Policy |
| TT | TSN Translator |
| TWIF | Trusted WLAN Interworking Function |
| UCMF | UE radio Capability Management Function |
| UDM | Unified Data Management |
| UDR | Unified Data Repository |
| UDSF | Unstructured Data Storage Function |
| UL | Uplink |
| UL CL | Uplink Classifier |
| UPF | User Plane Function |
| URLLC | Ultra Reliable Low Latency Communication |
| URRP-AMF | UE Reachability Request Parameter for AMF |
| URSP | UE Route Selection Policy |

-continued

| [Definitions] | |
| --- | --- |
| VID | VLAN Identifier |
| VLAN | Virtual Local Area Network |
| W-5GAN | Wireline 5G Access Network |
| W-5GBAN | Wireline BBF Access Network |
| W-5GCAN | Wireline 5G Cable Access Network |
| W-AGF | Wireline Access Gateway Function |

Definitions

For the purposes of the present document, the terms and definitions given in 3GPP TR 21.905 [1] and the following apply. A term defined in the present document takes precedence over the definition of the same term, if any, in 3GPP TR 21.905 [1].

LIST OF REFERENCES

[1] 3GPP TR 21.905: "Vocabulary for 3GPP Specifications". V16.0.0 (2019-06)

[2] GSM Association Official Document NG.116: "Generic Network Slice Template" V2.0 (2019-10)

[3] 3GPP TR 22.835: "Study on Enhanced Access to and Support of Network Slices" V0.2.0 (2020-11)

[4] 3GPP TS 23.501: "System architecture for the 5G System (5G5)". V16.7.0 (2020-12)

[5] 3GPP TS 23.502: "Procedures for the 5G System (5G5)". V16.7.0 (2020-12)

[6] 3GPP TS 38.413: "NG Application Protocol (NGAP)". V16.4.0 (2021-01)

[7] 3GPP TS 23.003: "Numbering, addressing and identification". V17.0.0 (2020-12)

Although the present invention has been described with reference to the exemplary embodiments, the present invention is not limited to the above. Various changes that can be understood by those skilled in the art can be made to the configuration and details of the present invention within the scope of the invention.

This application is based upon and claims the benefit of priority from Indian patent application No. 202111005728, filed on Feb. 10, 2021, the disclosure of which is incorporated herein in its entirety by reference.

What is claimed is:

1. A method of a User Equipment (UE), the method comprising:

performing a registration procedure, with a message including a timer and an indication that the UE only registers with a first Network Slice, wherein an application in the UE demands data transmission in the first Network Slice; and starting the timer, in response to an occurrence of a condition that a Protocol Data Unit (PDU) session is unavailable, wherein the PDU session is associated with the first Network Slice.

2. The method according to claim 1, wherein the first Network Slice is identified by Single Network Slice Selection Assistance Information (S-NSSAI).

3. A User Equipment (UE) comprising:

at least one processor; and at least one memory coupled to the at least one processor, the at least one memory storing instructions that, if executed by the at least one processor, cause the at least one processor to:

perform a registration procedure, with a message including a timer and an indication that the UE only registers with a first Network Slice, wherein an application in the UE demands data transmission in the first Network Slice; and start the timer, in response to an occurrence of a condition that a Protocol Data Unit (PDU) session is unavailable, wherein the PDU session is associated with the first Network Slice.

4. The UE according to claim 3, wherein the first Network Slice is identified by Single Network Slice Selection Assistance Information (S-NSSAI).

* * * * *